US012586031B2

(12) United States Patent
Chen et al.

(10) Patent No.: US 12,586,031 B2
(45) Date of Patent: Mar. 24, 2026

(54) PALLET TAG CLASSIFICATION FOR IMPROVED TEXT RECOGNITION ACCURACY

(71) Applicant: Walmart Apollo, LLC, Bentonville, AR (US)

(72) Inventors: Yilun Chen, McKinney, TX (US); Zhaoliang Duan, Frisco, TX (US); Lingfeng Zhang, Flower Mound, TX (US); Mingquan Yuan, Flower Mound, TX (US); William Craig Robinson, Centerton, AR (US); Ishan Arora, Bengaluru (IN); Benjamin Ellison, San Francisco, CA (US); Eric W. Rader, Plano, TX (US); Elizabeth Ann Siler, Rogers, AR (US); Han Zhang, Allen, TX (US); Abhinav Pachauri, Bangalore (IN); Siddhartha Chakraborty, Kolkata (IN); Raghava Balusu, Achanta (IN); Ashlin Ghosh, Ernakulam (IN); Avinash Madhusudanrao Jade, Bangalore (IN); Subhash Anand, Bengalore (IN); Aadarsh Gupta, Dallas, TX (US); Paul Lobo, Mumbai (IN); Ketan Shah, Dallas, TX (US); Zhiwei Huang, Flower Mound, TX (US); Jing Wang, Dallas, TX (US); Rongdong Chai, Allen, TX (US)

(73) Assignee: Walmart Apollo, LLC, Bentonville, AR (US)

( * ) Notice: Subject to any disclaimer, the term of this patent is extended or adjusted under 35 U.S.C. 154(b) by 172 days.

(21) Appl. No.: 18/537,949

(22) Filed: Dec. 13, 2023

(65) Prior Publication Data

US 2025/0200504 A1     Jun. 19, 2025

(51) Int. Cl.
| | |
|---|---|
| *G06Q 10/087* | (2023.01) |
| *G06N 3/0464* | (2023.01) |
| *G06N 3/0985* | (2023.01) |

(52) U.S. Cl.
CPC ......... *G06Q 10/087* (2013.01); *G06N 3/0464* (2023.01); *G06N 3/0985* (2023.01)

(58) Field of Classification Search
CPC ... G06Q 10/087; G06N 3/0985; G06N 3/0464
See application file for complete search history.

(56) References Cited

U.S. PATENT DOCUMENTS

| | | | |
|---|---|---|---|
| 10,984,378 B1 * | 4/2021 | Eckman | G06K 19/06131 |
| 2022/0332504 A1 * | 10/2022 | Voegele | G06T 7/0006 |

(Continued)

FOREIGN PATENT DOCUMENTS

| | | |
|---|---|---|
| CN | 114419638 A | 4/2022 |
| CN | 115909351 A | 4/2023 |

OTHER PUBLICATIONS

Sick Ag "Pallet classification system", Document No. 8028154, https://cdn.sick.com/media/docs/2/22/022/operating_instructions_pallet_classification_system_quality_control_systems_en_im0105022.pdf Erwin-Sick-Str. 1 • 79183 Waldkirch ∩ Germany www.sick.com, 8028154/2023-01-10, 74 pages.

(Continued)

*Primary Examiner* — Ariel J Yu
*Assistant Examiner* — Denisse Y Ortiz Roman
(74) *Attorney, Agent, or Firm* — Foley IP Law, PLLC

(57) ABSTRACT

Examples provide for pallet classification and pallet tag text recognition. The system includes a pallet text manager that classifies a type of pallet tag based on detected lines of text in the pallet tag using a classification model. Qualified lines of text are selected from the detected lines of text based on the classification type and corresponding format of the text.

(Continued)

Each qualified line of text is associated with a pallet attribute, such as a pallet identifier (ID), an item ID, or a date of creation of the pallet tag. Attribute values from the set of qualified lines of text are paired with location data for the current location of the pallet. The attribute values and the paired location data are saved in a pallet attribute table. The pallet attributes are used to identify the location of pallets in a retail facility with improved accuracy and efficiency.

20 Claims, 12 Drawing Sheets

(56) References Cited

U.S. PATENT DOCUMENTS

| | | |
|---|---|---|
| 2023/0252407 A1 | 8/2023 | Kim et al. |
| 2023/0410119 A1 | 12/2023 | Scholl |

OTHER PUBLICATIONS

Mohamed, I.S., et al. "Detection, localisation and tracking of pallets using machine learning techniques and 2D range data", Neural Comput & Applic 32, 8811-8828 (2020). 18 pages.

* cited by examiner

Figure 1:
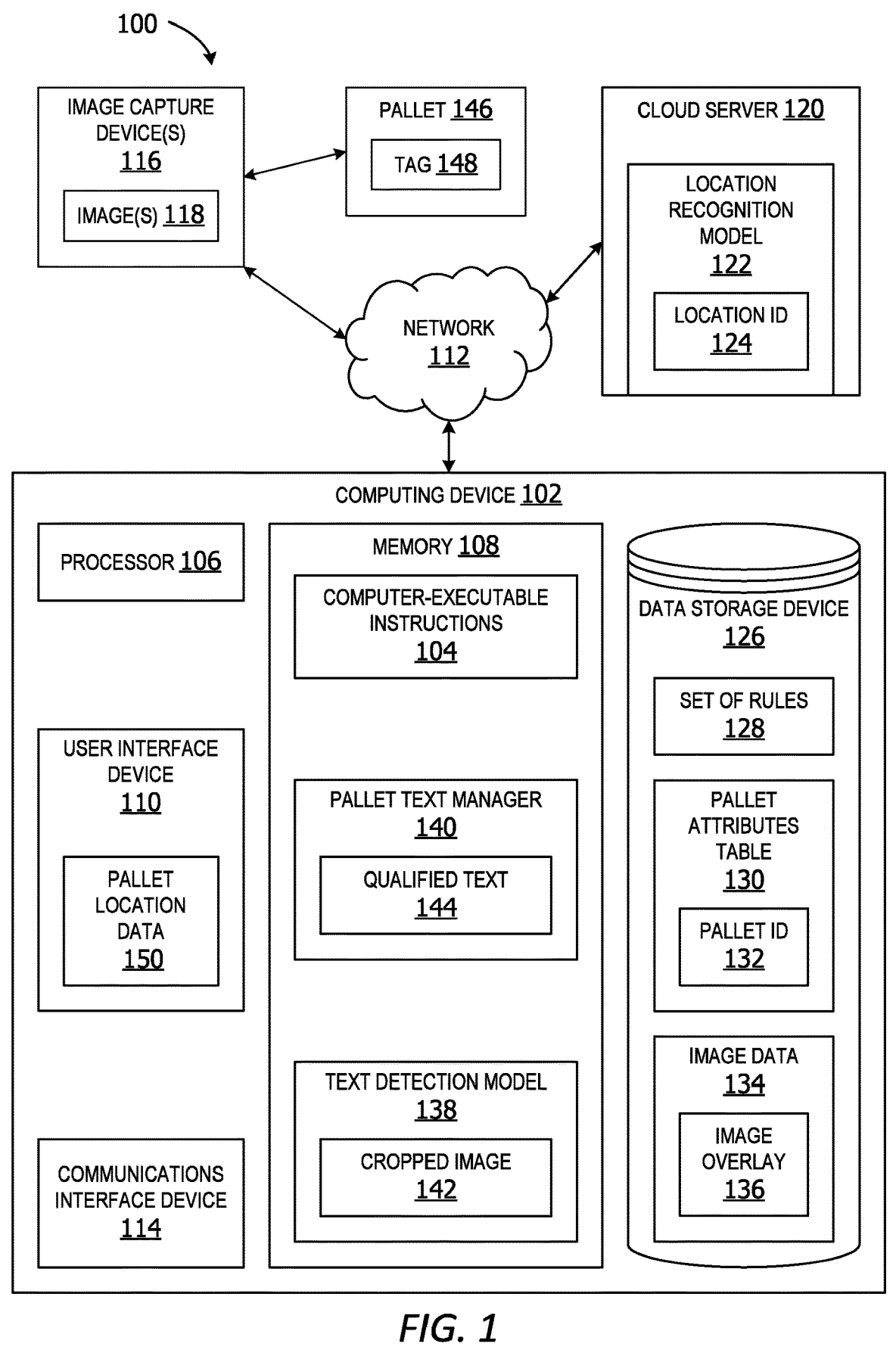

100

IMAGE CAPTURE DEVICE(S) 116

IMAGE(S) 118

PALLET 146

TAG 148

CLOUD SERVER 120

LOCATION RECOGNITION MODEL 122

LOCATION ID 124

NETWORK 112

COMPUTING DEVICE 102

PROCESSOR 106

MEMORY 108

COMPUTER-EXECUTABLE INSTRUCTIONS 104

DATA STORAGE DEVICE 126

SET OF RULES 128

USER INTERFACE DEVICE 110

PALLET LOCATION DATA 150

PALLET TEXT MANAGER 140

QUALIFIED TEXT 144

PALLET ATTRIBUTES TABLE 130

PALLET ID 132

COMMUNICATIONS INTERFACE DEVICE 114

TEXT DETECTION MODEL 138

CROPPED IMAGE 142

IMAGE DATA 134

IMAGE OVERLAY 136

START

OBTAIN IMAGE DATA
1502

TILTED
TEXT?
1504

NO → ENCLOSE TEXT IN RECTANGULAR BOUNDING BOX
1506

YES

GENERATE TEXT-RELATED VALUES AND NON-TEXT RELATED VALUES FOR IMAGE PIXELS
1508

IDENTIFY SMALLEST SIZED QUADRILATERAL BOUNDING BOX CAPABLE OF ENCLOSING TEXT-RELATED PIXELS
1510

ENCLOSE PIXELS ASSOCIATED WITH TEXT USING SMALLEST SIZED BOUNDING BOX
1512

END

PALLET TAG CLASSIFICATION FOR IMPROVED TEXT RECOGNITION ACCURACY

BACKGROUND

In retail facilities, it is frequently necessary to move pallets of items to different locations within the facility for temporary storage, long-term storage, placement on the floor for re-stocking of items on shelves, etc. However, manually keeping track of the locations of pallets in large retail facilities, such as distribution centers (DCs) and big box stores, is often difficult, time-consuming, and cost prohibitive. Computer vision item recognition can be used to automatically analyze images of pallets and pallet tags within a store or other retail facility to identify pallets and pallet locations. However, computer vision object identification results are sometimes unreliable or unavailable in some situations in which image data is sub-optimal, such as where the pallet tag image data includes gray scale images, tilted text in pallet tag images due to tilted camera angles, differing pallet tag formats and/or handwritten pallet tags. The challenges resulting from these sub-optimal types of pallet text image data frequently result in inaccurate and unreliable pallet identification and location results. The results can be manually verified and corrected by human users; however, this method can be a laborious, impractical, cost-prohibitive, and overly time-consuming process.

SUMMARY

Some examples provide a system for pallet text detection and recognition with improved accuracy. The system includes a computer-readable medium storing instructions that are operative upon execution by a processor to detect a plurality of lines of text associated with an image of a pallet tag. The plurality of lines of text associated with a first tag format. The system classifies the type of the pallet tag based on the plurality of lines of text. The type of the pallet tag corresponding to the first tag format. A set of qualified lines of text within the plurality of lines of text is selected using the first tag format associated with the type of pallet tag. A qualified line of text includes a pallet attribute. A set of pallet attribute values are extracted from the set of qualified lines of text. The set of pallet attribute values includes a pallet identifier (ID). The set of pallet attribute values are mapped to a location ID in a pallet entry within the pallet attributes table. The location ID identifies a location of the pallet within the retail facility. The location of the pallet is presented to a user via a user interface device for improved accuracy locating pallets within the retail facility.

Other examples provide a method for pallet text detection and recognition with improved accuracy. A pallet text manager receives a portion of an image associated with a detected pallet tag associated with a pallet within a retail facility from a pallet tag detection model. The image is generated by an image capture device within the retail facility. The pallet text manager recognizes a plurality of lines of text associated with the pallet tag by a text detection model. The pallet text manager classifies the pallet tag with a classification type based on the plurality of lines of text by a classification model. The classification type of the pallet tag corresponds to a first tag format. The pallet text manager identifies a set of qualified lines of text within the plurality of lines of text using the first tag format associated with the type of pallet tag. The pallet text manager extracts a set of pallet attribute values from the set of qualified lines of text.

The pallet text manager assigns the extracted set of pallet attribute values to a set of pallet attribute fields within a pallet attributes table. The set of pallet attribute values paired with a location ID are stored in the assigned set of pallet attribute fields of the pallet attributes table in a data storage device.

Still other examples provide a storage devices having computer-executable instructions stored thereon, which, upon execution by a computer, cause the computer to perform operations comprising obtaining a portion of an image associated with a detected pallet tag of a pallet within a retail facility from a pallet tag detection model. The image is generated by an image capture device within the retail facility. A plurality of lines of text associated with the pallet tag are detected. The plurality of lines of text are associated with a first tag format. The pallet tag is classified with a type of the pallet tag by a classification model based on a source of the pallet. A set of qualified lines of text are selected from the plurality of lines of text using the first tag format associated with the type of pallet tag. A set of pallet attribute values are identified from the set of qualified lines. The set of pallet attribute values includes a pallet ID associated with the pallet. The set of pallet attribute values is paired with location data identifying a current location of the pallet within the retail facility in a pallet entry within the pallet attributes table. The pallet ID with the location data is presented to a user via a user interface device to assist the user locating the pallet within the retail facility.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1 is an exemplary block diagram illustrating a system for pallet tag text recognition and classification.

Corresponding reference characters indicate corresponding parts throughout the drawings.

DETAILED DESCRIPTION

Figure 2:
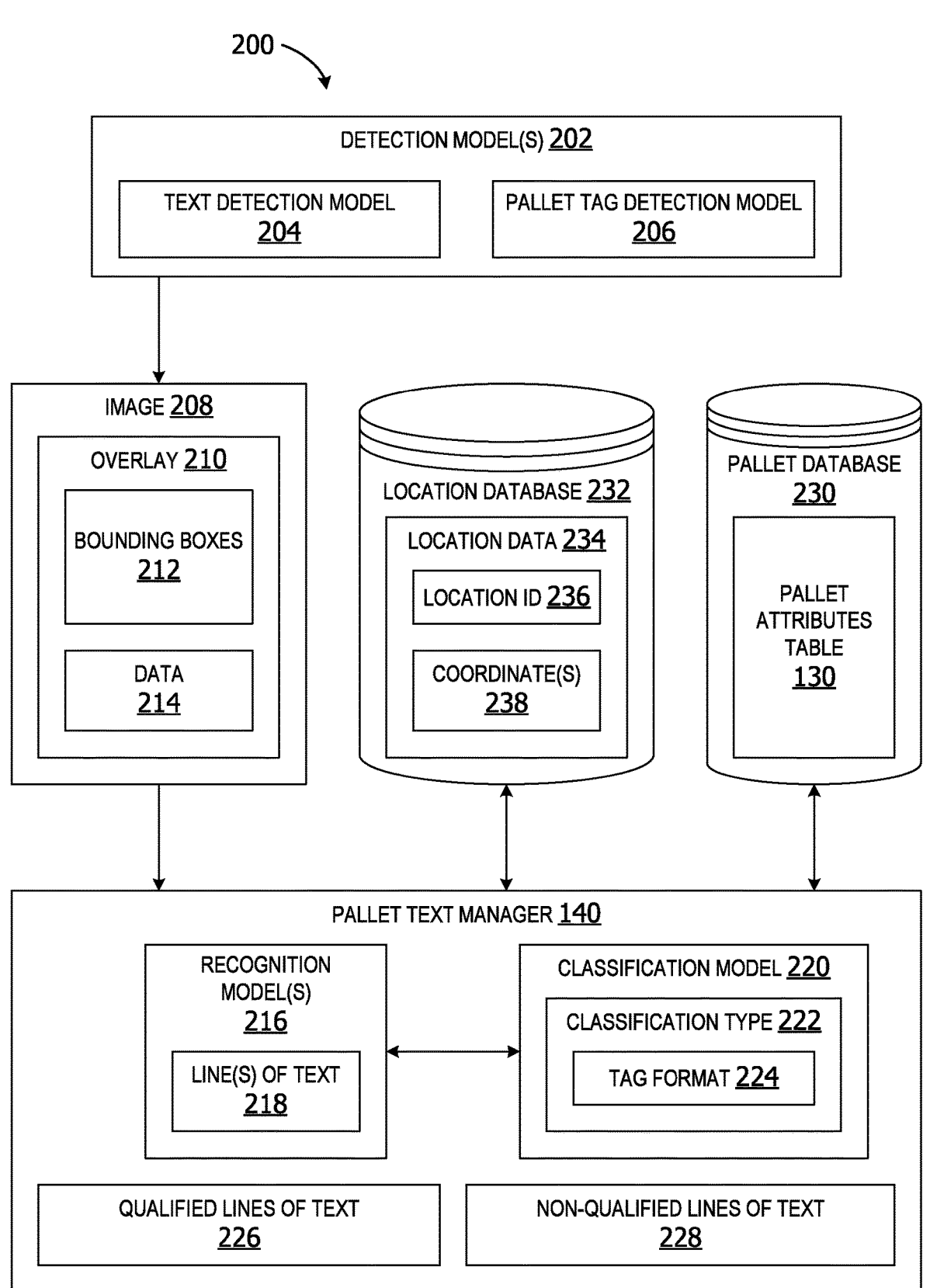
FIG. 2 is an exemplary block diagram illustrating a system for pallet tag classification and text recognition for identifying pallet tag attributes.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

To keep products available for customers, store associates frequently inspect stock levels manually by performing a walk of the store and making subjective decisions regarding whether products need to be restocked. Restocking products typically requires associates to locate, transport, and place (or relocate) corresponding pallets of items from storage structures or storage areas to a retail area of the facility, such as the sales floor. To locate and stock or re-stock products, associates rely on pallet management systems providing pallet information identifying pallets, pallet contents and the current location of pallets in the store, warehouse, distribution center, or other retail facilities.

However, in many systems, less than a third of the pallets are correctly identified and paired with accurate location data in the pallet management systems. Therefore, human users cannot rely on the pallet location and identification data available in the systems. Instead, human users most often rely on a combination of memory and time-consuming multi-aisle searching. Additionally, human error results in both missed products that should be relocated, as well as incorrectly stocked or placed products. Additionally, incorrect pallet data leads to the wrong pallets being removed from storage structures and relocated to other areas of the facility inappropriately. This results in wasted time and resources both in retrieving and transporting the incorrect pallet or retrieving and transporting to an incorrect location, as well as in returning the incorrect pallet back to the storage structure and resuming the search for the correct pallet. The solution is better able to handle challenges associated with recognizing the pallet identification data and item number of products on pallets automatically in complex pallet tag text situations and edge cases involving different types of tags with differing tag formats, changing tag formats, tilted text, gray scale images, and other detection and recognition issues is needed.

Referring to the figures, examples of the disclosure enable a pallet text manager that performs text recognition and pallet tag classification to identify pallets, pallet content(s), and pallet location more quickly, accurately, and efficiently. In some examples, a pallet text manager performs pallet tag classification to distinguish between different types of pallets, based on a source of each pallet. The types of pallets include distribution center (DC) pallets, store or retail pallets, and some other pallets referred to as noisy pallets due to handwritten text on the pallet tag. A tag format is associated with each pallet tag classification type. The pallet tag classification type is used to identify the tag format of qualified lines of text within recognized text on the pallet tags. This enables more accurate identification of pallet attribute data within pallet tag text using computer vision text recognition.

Some embodiments include an item recognition as a service (IRAS) computer vision (CV) platform that analyzes image data to recognize pallets and pallet tags. A pallet text manager includes a specially trained convolutional neural network (CRNN) recognition model that specializes in recognizing small text, such as the text found in pallet tags and a CRNN classification model that classifies pallets according to the type of the pallet and/or the source of the pallet. The classification type is used to identify a type of format of pallet attributes in the text on the pallet tag, which is used to recognize qualified lines of text and extract desired attribute data automatically from the tag image data more accurately. This enables faster and more accurate recognition of pallets and pallet locations while minimizing text recognition errors.

Aspects of the disclosure further enable a pallet text manager capable of handling computer vision analysis in complex pallet tag situations, such as with edge cases associated with on-site processing of image data for both object detection and object recognition, such as pallet recognition, pallet tag recognition and pallet text recognition, to reduce latency and improve speed of CV results.

The complex pallet tag cases include, for example, situations in which the pallet tag image data includes gray scale images instead of color images, camera tilted angle and multiple types of pallets with different layouts and text fonts with a reduced error rate identifying pallet attributes while filtering out noise in the detected pallet tag text. The system provides more flexible and adaptive image analysis for improved accuracy of the detected and recognized text further enabling real-time identification and location of pallets within large areas, such as retail facilities including distribution centers, big box stores, warehouses and other spaces storing pallets.

The computing device operates in an unconventional manner by enabling classification of a variety of different types of pallet tags having different text formats for improved pallet tag text recognition and identification of pallet attributes while reducing the error rate reading tag data, and further allows reduced system resource usage re-training models to read each different type of tag format and human resources consumed manually searching for pallets due to incorrect pallet identification and/or incorrect pallet location data linked to pallets. This improves the functioning of the underlying computing device by reducing processor usage and memory usage which would otherwise be consumed in retraining deep learning models to recognize each different type of pallet tag format and/or correct erroneous pallet tag identification data, as well as more accurate handling of complex pallet tag situations and edge cases to reduce latency and improve efficiency in accurate pallet tag text recognition results Some embodiments provide a pallet text manager having a classification model that classifies pallets using a classification type corresponding to a tag format used to recognize text, identify qualified lines of text and isolate pallet attributes in the recognized text. The pallet text manager provides high accuracy handling of a wide variety of pallet tags with differing text formats using lightweight models that detect and recognize very small text on small pallet tags without requiring additional labeling or training for different types of tags. This reduces both processor usage and memory usage consumed in training or retraining the models to detect and recognize text in different types of pallet tags.

Fine-tuning of hyperparameters associated with CRNN models is utilized, in other examples, enabling the system to handle changing formats and fonts in the pallet tags. In this manner, a model trained to handle a first version of data associated with a first pallet tag format is also able to handle a second version of data associated with a new or updated pallet tag format without creating relabeled data for training or retraining the model(s) used to recognize the pallet tag text and identify pallet attributes in the text. This reduces user time spent manually relabeling data and retraining the model while improving the overall efficiency of the model, which is capable of handling multiple different types of pallet tag formats without retraining.

In still other embodiments, the system generates more accurate and reliable pallet identification and location data using a classification model and recognition model for recordation in a pallet attributes table The pallet attributes are presented to a user via a user interface device to assist the users in locating pallets within a retail facility in real time for improved user efficiency via user interface (UI) interaction and increased user interaction performance.

Referring again to FIG. 1, an exemplary block diagram illustrates a system 100 for pallet tag text recognition and classification. In the example of FIG. 1, the computing device 102 represents any device executing computer-executable instructions 104 (e.g., as application programs, operating system functionality, or both) to implement the operations and functionality associated with the computing device 102. The computing device 102, in some examples includes a mobile computing device or any other portable device. A mobile computing device includes, for example but without limitation, a mobile telephone, laptop, tablet, computing pad, netbook, gaming device, and/or portable media player. The computing device 102 can also include less-portable devices such as servers, desktop personal computers, kiosks, or tabletop devices. Additionally, the computing device 102 can represent a group of processing units or other computing devices.

In some examples, the computing device 102 has at least one processor 106 and a memory 108. The computing device 102, in other examples includes a user interface device 110.

The processor 106 includes any quantity of processing units and is programmed to execute the computer-executable instructions 104. The computer-executable instructions 104 are performed by the processor 106, performed by multiple processors within the computing device 102 or performed by a processor external to the computing device 102. In some examples, the processor 106 is programmed to execute instructions such as those illustrated in the figures (e.g., FIG. 12, FIG. 13, FIG. 14, and FIG. 15).

The computing device 102 further has one or more computer-readable media such as the memory 108. The memory 108 includes any quantity of media associated with or accessible by the computing device 102. The memory 108 in these examples is internal to the computing device 102 (as shown in FIG. 1). In other examples, the memory 108 is external to the computing device (not shown) or both (not shown). The memory 108 can include read-only memory and/or memory wired into an analog computing device.

The memory 108 stores data, such as one or more applications. The applications, when executed by the processor 106, operate to perform functionality on the computing device 102. The applications can communicate with counterpart applications or services such as web services accessible via a network 112. In an example, the applications represent downloaded client-side applications that correspond to server-side services executing in a cloud.

In other examples, the user interface device 110 includes a graphics card for displaying data to the user and receiving data from the user. The user interface device 110 can also include computer-executable instructions (e.g., a driver) for operating the graphics card. Further, the user interface device 110 can include a display (e.g., a touch screen display or natural user interface) and/or computer-executable instructions (e.g., a driver) for operating the display. The user interface device 110 can also include one or more of the following to provide data to the user or receive data from the user: speakers, a sound card, a camera, a microphone, a vibration motor, one or more accelerometers, a BLUETOOTH® brand communication module, wireless broadband communication (LTE) module, global positioning system (GPS) hardware, and a photoreceptive light sensor. In a non-limiting example, the user inputs commands or manipulates data by moving the computing device 102 in one or more ways.

The network 112 is implemented by one or more physical network components, such as, but without limitation, routers, switches, network interface cards (NICs), and other network devices. The network 112 is any type of network for enabling communications with remote computing devices, such as, but not limited to, a local area network (LAN), a subnet, a wide area network (WAN), a wireless (Wi-Fi) network, or any other type of network. In this example, the network 112 is a WAN, such as the Internet. However, in other examples, the network 112 is a local or private LAN.

In some examples, the system 100 optionally includes a communications interface device 114. The communications interface device 114 includes a network interface card and/or computer-executable instructions (e.g., a driver) for operating the network interface card. Communication between the computing device 102 and other devices, such as but not limited to one or more image capture device(s) 116 generating image(s) 118 of pallets and/or a cloud server 120, can occur using any protocol or mechanism over any wired or wireless connection. In some examples, the communications interface device 114 is operable with short range communication technologies such as by using near-field communication (NFC) tags.

The image capture device(s) 116 includes one or more image capture devices for generating image(s) 118 of pallets and/or pallet tags within a retail facility. A retail facility is any type of retail environment including an indoor area, outdoor area and/or a partially enclosed area for storing and/or displaying items for retail sale, such as, but not limited to, a store and/or distribution center. The image(s) 118 in the example of FIG. 1 are digital images generated by a digital camera. The images optionally include still images as well as digital video images. The image(s) 118 can be color images and/or black-and-white (gray scale) images. The image(s) 118 includes images of pallets, pallet tags, item storage structures, and/or other elements within the retail facility.

The cloud server 120 is a logical server providing services to the computing device 102 or other clients The cloud server 120 is hosted and/or delivered via the network 112. In some non-limiting examples, the cloud server 120 is associated with one or more physical servers in one or more data centers. In other examples, the cloud server 120 is associated with a distributed network of servers.

In the non-limiting example shown in FIG. 1, the cloud server 120 hosts a location recognition model 122 which generates a location identification (ID) 124 associated with a location of the image capture device(s) 116 generating the image(s) and/or a location of the pallet(s) captured in the image(s) 118. The location recognition model 122 is implemented as a convolutional neural network deep learning model which performs computer vision on image data to identify a location based on a location tag captured within the image, such as a location tag on an item storage structure. In other examples, the location recognition model identifies the current location of the image capture device using coordinates or other location-related data generated by the image capture device and transmitted to the cloud server 120 via the network 112.

The system 100 can optionally include a data storage device 126 for storing data, such as, but not limited to a set of rules 128, a pallet attributes table 130 and/or image data 134. The set of one or more rules 128 is a set of rules optionally applied by the pallet text manager 140 to identify qualified lines of text and/or qualified contents of text detected and/or recognized by the model(s). The set of rules 128 optionally also includes pallet attribute data formats, rules for interpreting bounding boxes and color indicators provided within an image overlay 136. For example, a rule may state that a line of text including a date having a format year-month-day or month-day-year is a qualified line of text. Likewise, another rule may state that a line of text including a string of alphanumeric characters of a predefined number is a qualified line of text. An example rules optionally states that a series of numbers having exactly eight digits is a qualified line of text. Another example rules optionally states that a line of text having a series of consecutive number having a number of digits within a range from seven digits to ten digits is a qualified line of text associated with a pallet ID or an item ID.

The classification model classifies the pallet represented in the image(s) 118 based on the format of information within the pallet tag 148 and/or the source of the pallet 146. The pallet tag 148 is classified in accordance with the tag format of the text data in the pallet tag. The tag 148 format is the format of the attributes presented in the pallet tag 148 text. The tag format includes the font of the text and/or the layout of the pallet attributes data in the text.

The image overlay is an overlay added to image data 134. The overlay includes detection and recognition data added by a text detection model 138 and/or a text recognition model. The image overlay 136 includes color data, such as colored bounding boxes. Different colors can indicate different types of information, such as including a green bounding box to enclose pallet tag items recognized in the image(s) 118. The green bounding box is added as an overlay to one or more of the image(s) 118. However, the embodiments are not limited to a green bounding box. The embodiments can include item detection and recognition data encoded using red markings, yellow markings, orange markings or any other color markings, such as bounding boxes.

Moreover, the system is not limited to adding bounding boxes within an image overlay. In other embodiments, the system adds arrows, lines, circles, rectangular bounding boxes, triangular bounding lines, quadrilateral bounding boxes, or any other type of markings to the image data 134.

The text detection model 138 is a computer vision convolutional neural network deep learning model for analyzing image(s) 118 and detecting items within the image(s). The text detection model 138 is trained using labeled training data to recognize pallet tags 148 within the image(s). The text detection model 138 crops the image(s) to isolate the pallet tag 148 within the image(s) and reduce noise in the image data. The cropped image 142 is provided to the pallet text manager 140 for further analysis to identify and locate pallets within the retail facility.

The pallet attributes table 130 is a table of pallet attributes data, such as, but not limited to, pallet ID 132, item ID and/or the date the pallet tag was created. The pallet ID 132 is an identifier associated with the pallet 146. The pallet ID 132 can include numbers, letters, or any other identifiers. The pallet ID 132, in this example, is a pallet identification number. In another example, the pallet ID 132 is a series of alphanumeric characters. The pallet ID can optionally be used to check the contents of the pallet by performing a pallet ID lookup in the pallet attribute table.

The item ID is an identifier associated with an item packaged within the pallet 146. In this example, the item ID is a serial number. However, in other embodiments, the item ID can optionally include alphanumeric characters. The date can include symbols, such as dash symbols. Noisy pallet tags, such as handwritten pallet tags, can include letters, characters, and other symbols.

The data storage device 126 can include one or more different types of data storage devices, such as, for example, one or more rotating disks drives, one or more solid state drives (SSDs), and/or any other type of data storage device. The data storage device 126 in some non-limiting examples includes a redundant array of independent disks (RAID) array. In some non-limiting examples, the data storage device(s) provide a shared data store accessible by two or more hosts in a cluster. For example, the data storage device may include a hard disk, a redundant array of independent disks (RAID), a flash memory drive, a storage area network (SAN), or other data storage device. In other examples, the data storage device 126 includes a database, such as, but not limited to, the database 500 in FIG. 5.

The data storage device 126 in this example is included within the computing device 102, attached to the computing device, plugged into the computing device, or otherwise associated with the computing device 102. In other examples, the data storage device 126 includes a remote data storage accessed by the computing device via the network 112, such as a remote data storage device, a data storage in a remote data center, or a cloud storage.

The memory 108 in some examples stores one or more computer-executable components. The pallet text manager 140 component, when executed by the processor 106 of the computing device 102, obtains an image or a portion of an image associated with a detected pallet tag 148 on a pallet 146 within a retail facility from a pallet tag detection model 138. The image is generated by the image capture device(s) 116 within the retail facility. The pallet text manager 140 detects a plurality of lines of text associated with the pallet tag 148. The plurality of lines of text are associated with a tag format. The pallet text manager 140 classifies a type of the pallet tag 148 associated with a source of the pallet 146 based on the plurality of lines of text. The type of the pallet tag corresponds to the tag format. The tag format includes the font and layout. The pallet text manager 140 identifies a set of qualified lines of qualified text 144 using the tag format associated with the classified type of the pallet tag. The pallet text manager 140 extracts a set of pallet attribute values from the set of qualified lines. The set of pallet attribute values includes the pallet ID 132 identifying the pallet 146. The pallet text manager 140 pairs the set of pallet attribute values with location data identifying a current location of the pallet within the retail facility in a pallet entry within the pallet attributes table 130. The pallet ID 132 with the pallet location data 150 is presented to a user via the user interface device 110 to assist the user locating the pallet within the retail facility.

In the example shown in FIG. 1, the pallet ID and pallet location data 150 is presented to the user via the user interface device 110 on the computing device 102. In other examples, the pallet ID 132 and the pallet location data 150 are presented to the user via a user interface on a user device or other computing device.

FIG. 2 is an exemplary block diagram illustrating a system 200 for pallet tag classification and text recognition for identifying pallet tag attributes. One or more detection model(s) 202 detect pallet tags and pallet text using image data obtained from one or more images generated by an image capture device, such as, but not limited to, the image capture device(s) 116 in FIG. 1. The detection model(s) 202 includes a text detection model 204 and/or a pallet tag detection model 206. The pallet tag detection model is convolutional neural network deep learning model trained to detect pallet tags in the images. The text detection model 204 is a convolutional neural network deep learning model trained to detect text on pallet tags within image(s) or portions of images, such as, but not limited to, the image 208.

The image 208 is an image of a pallet tag including text on the pallet tag. The detection model(s) 202 adds an overlay 210 to the image. The overlay includes embedded detection data, such as, but not limited to, bounding boxes 212 surrounding detected text and other detection data 214. The detection data 214 can include color coded information, such as different colored boxes to indicate different detected items in the image. For example, the overlay can include a red bounding box surrounding a detected pallet and a green bounding box surrounding the detected pallet tag. The overlay can optionally also include a different colored bounding box surrounding the detected text on the pallet tag.

The pallet tag manager 140 includes one or more recognition models(s) 216 for detecting one or more line(s) of text 218 printed or otherwise written on the pallet tag using the image 208 of the pallet tag. The line(s) of text 218 text lines having pallet attribute information. The lines of text including attribute information are qualified lines of text 226. The line(s) of text may also include one or more lines of text without pallet attribute information. The lines of text without pallet attribute information are non-qualified lines of text 228.

In some embodiments, the classification model 220 classifies each pallet tag using one or more rules to identify a classification type 222 of each pallet tag. The classification type 222 is a classification that corresponds to a tag format 224 of the text on the tag. The tag format 224 includes a format in which the pallet attribute lines of text are presented on the tag. For example, a first tag format may specify that the pallet ID is provided in the first line of text, the item ID is provided in the second line of text and the date the pallet tag is created is provided in the third line of text. A different tag format 224 may provide the pallet ID and the date the pallet tag is created in the first line of text and the item ID in the second line of text and no third line of text on the tag.

The pallet text manager 140 extracts the pallet attributes from the set of one or more qualified lines of text 226. The pallet text manager 140 stores the extracted pallet attributes in a pallet attributes table 130. The pallet attributes table 130 is stored on a pallet database 230 in this example.

A location database 232 includes location data 234 associated with a location of one or more pallets in a retail facility. The location data 234 includes a location ID 236 associated with the location of the pallet and/or coordinate(s) 238 of a robotic device having an image capture device mounted to the robotic device, such as, but not limited to, the robotic device 302 in FIG. 3 below. The coordinate(s) are coordinates associated with the location of the mobile robotic device at the time the mobile robotic device utilized the image capture device to generate the image 208 of the pallet tag.

The pallet text manager 140 pairs or otherwise maps the location data of the pallet with the pallet attributes extracted from the pallet text data for the pallet tag on the pallet. The pallet attributes paired with the location data is stored in the pallet attributes table 130.

Figure 3:
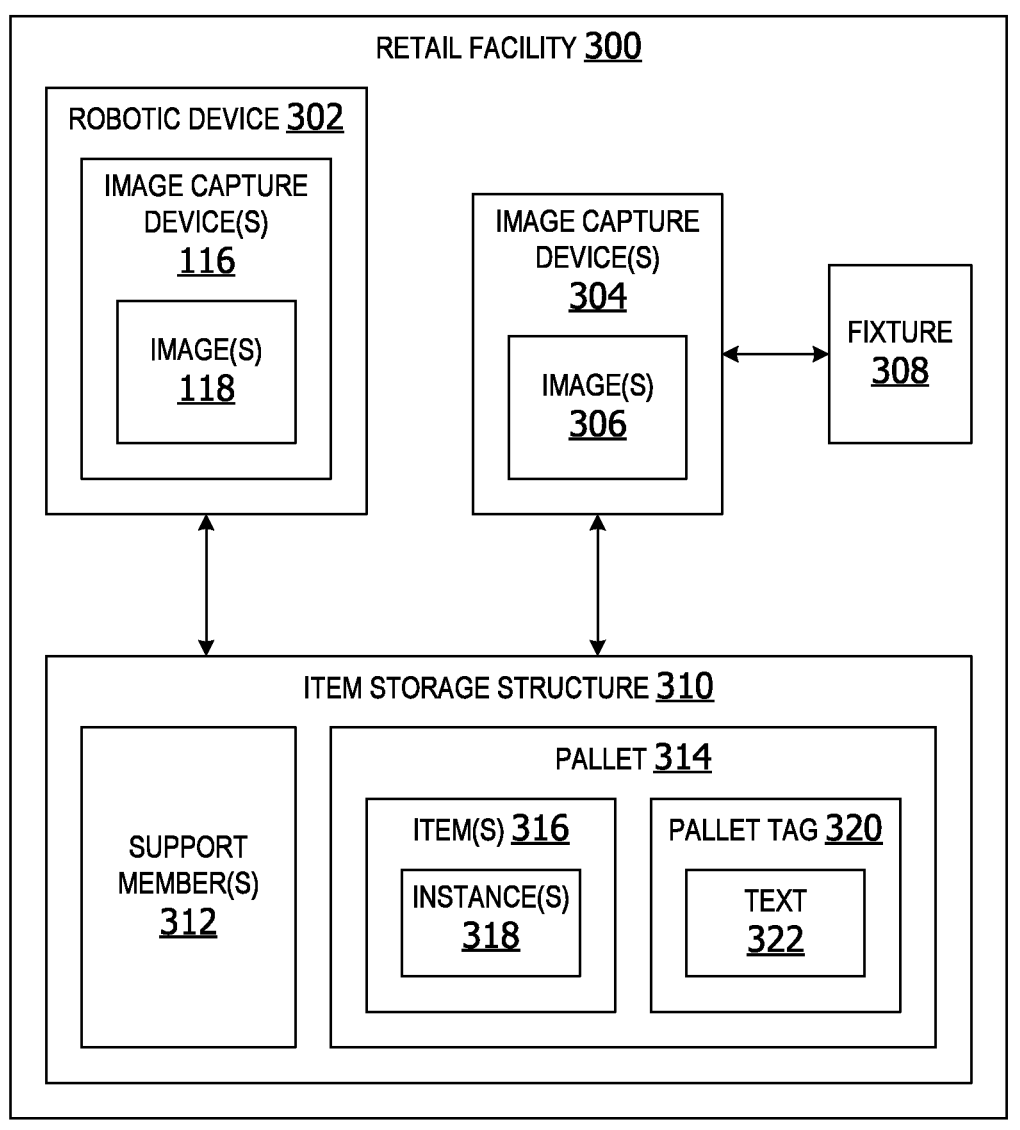
FIG. 3 is an exemplary block diagram illustrating a retail facility including image capture devices generating images of pallets and pallet tags for use in pallet tag recognition and classification.

Turning now to FIG. 3, an exemplary block diagram illustrating a retail facility 300 including image capture devices generating images of pallets and pallet tags for use in pallet tag recognition and classification is shown. In this example, the retail facility 300 includes one or more robotic devices having image capture device(s) 116 mounted to them, such as, but not limited to, the robotic device 302. The robotic device 302 roams around the retail facility generating image(s) 118 of pallets and pallet tags within the retail facility 300.

The retail facility 300 optionally includes one or more image capture device(s) 304 mounted to one or more fixtures within the retail facility 300, such as, but not limited to, the fixture 308. The fixture 308 is a fixture, such as, but not limited to, a shelf, pillar, wall, ceiling, display case, or any other fixture. The image capture device(s) 304 generates image(s) 306 of pallets, such as, but not limited to, the pallet 314 stored on an item storage structure 310. In other embodiments, the image capture device is a handheld camera, or a camera integrated into a user device which is used to generate images of pallets within the item storage structure.

The item storage structure 310 is a structure for storing pallets. The item storage structure is a structure, such as a bin, shelf, display case, or any other type of storage structure. The item storage structure 310 includes one or more support member(s) 312, such as a vertical steel bar, a horizontal steel bar, or any other type of support member. The item storage structure 310 stores, holds, encloses, or otherwise supports one or more pallets. A pallet may rest on a portion of the item storage structure, beneath an item storage structure, next to an item storage, or within the item storage structure.

The pallet 314 includes one or more instance(s) 318 of one or more item(s) 316 on or in the pallet 314. The pallet 314 includes a pallet tag 320 affixed to an exterior portion of the pallet 314. The pallet tag 320 includes one or more lines of text 322 describing attributes of the pallet, such as the pallet ID, item ID of each different type of item on the pallet 314, and/or the date the pallet tag was created.

Figure 4:
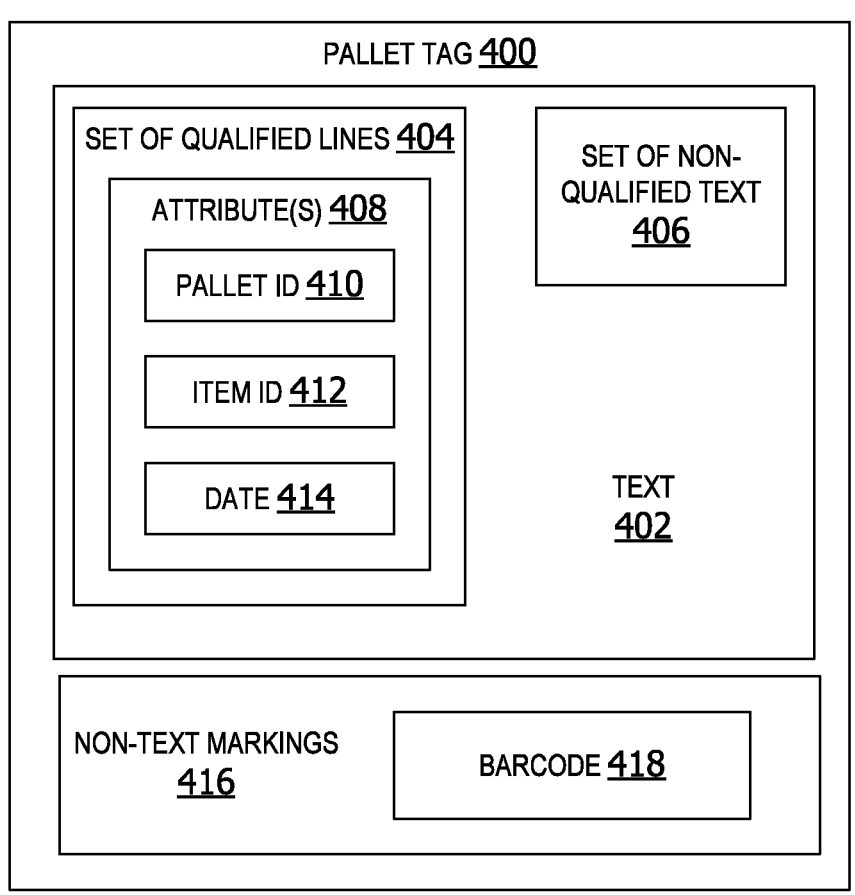
FIG. 4 is an exemplary block diagram illustrating a pallet tag having a set of qualified lines of text including pallet attributes.

FIG. 4 is an exemplary block diagram illustrating a pallet tag 400 having a set of qualified lines 404 of text 402 including pallet attribute(s) 408. The attribute(s) includes the pallet ID 410, item ID 412 and/or the date 414 the pallet tag 400 was created. The pallet tag text 402 may be printed text or handwritten text.

The text 402 also includes a set of non-qualified text 406. The set of non-qualified text 406 includes one or more lines of text which does not include attribute data associated with a pallet. The set of non-qualified text 406 are filtered out or otherwise ignored by the pallet text manager. The pallet tag 400 optionally also includes non-text markings 416, such as, but not limited to, a barcode 418. The barcode is a non-text marking encoding information, such as a universal product code (UPC), matrix barcode, or other marking.

Figure 5:
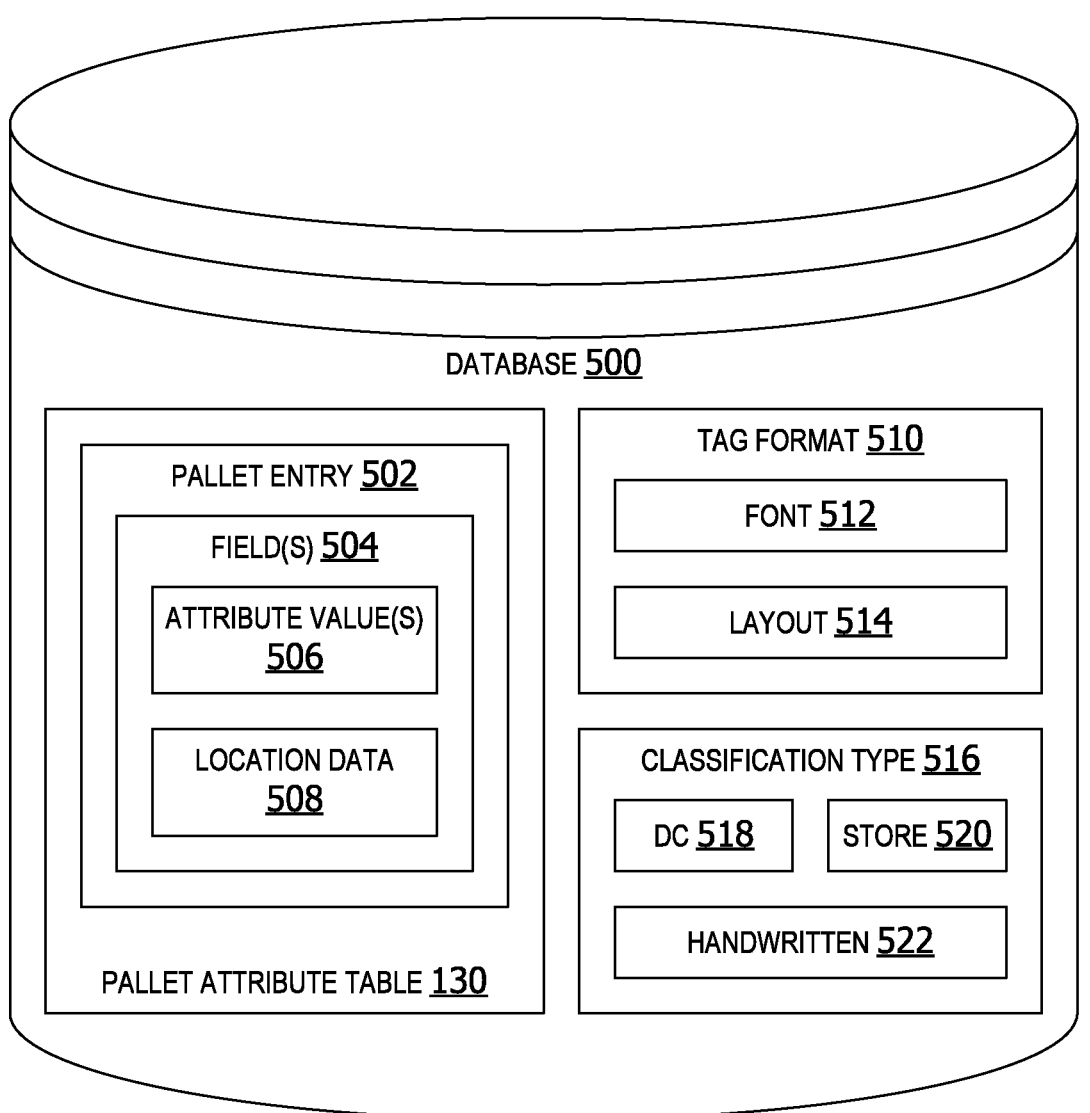
FIG. 5 is an exemplary block diagram illustrating a database storing pallet-related data for use in identifying and locating pallets in a retail facility.

Turning now to FIG. 5, an exemplary block diagram illustrating a database 500 storing pallet-related data for use in identifying and locating pallets in a retail facility, such as, but not limited to, the retail facility 300 in FIG. 3. The database 500 is a database, such as, but not limited to, the location database 232 and/or the pallet database 230. The database 500 is stored on a data storage device, such as, but not limited to, the data storage device 126 in FIG. 1.

The database 500 includes a pallet attribute table 130 having one or more entries associated with one or more pallets. In this example, the pallet entry 502 is an entry for a pallet, such as, but not limited to, the pallet 146 in FIG. 1 and/or the pallet 314 in FIG. 3. The pallet entry 502 includes one or more pallet attribute field(s) 504 for storing one or more attribute value(s) 506 and/or location data 508 associated with each pallet. The attribute value(s) 506 includes values for attributes such as, but not limited to, the pallet ID, item ID and/or creation date for the pallet tag.

The database 500 optionally also includes other data, such as tag format 510 data. The tag format data can include text font 512 and text layout 514 of text detected and recognized on the pallet tag. The tag format 510 may be included in the training data set used to train the detection model(s).

The font 512 optionally includes the font style, font size, font color and/or any other attributes of the font. The font layout 514 optionally includes data associated with the layout or location of different types of information on the tag, such as the approximate location on the pallet tag where the pallet ID is expected to be found. The pallet database is updated dynamically each day with new pallet entries for newly arrived pallets and/or updates pre-existing pallet entries for pallets at each retail facility daily. In some embodiments, the database is updated daily for each store. In other embodiments, the database is updated periodically whenever new image data associated with a pallet is received from any image capture device is received. In this manner, users can track the changing locations of pallets within the retail facility.

A classification type 516 is assigned to each pallet tag. The classification type 516 is associated with the source of the pallet. Pallets received from the same source are typically of the same classification type. The classification type can optionally also refer to an anomalous pallet tag, such as a handwritten pallet tag.

In an example, if two pallets are received from two different sources, the pallet tags for the two different pallets are typically going to have different classification types. The classification types include, for example, DC 518 classification indicating a pallet came from a distribution center, store 520 classification indicating a pallet came from another store and handwritten 522 classification indicating a pallet tag contains handwritten information. The handwritten information may be included in addition to typed or printed information. The handwritten information may also be provided instead of typed or printed information.

In other embodiments, the database 500 optionally includes pallet tag catalog data used to train the model(s). The pallet tag catalog includes examples of pallet tags used to train the model to detect pallet tags.

Figure 6:
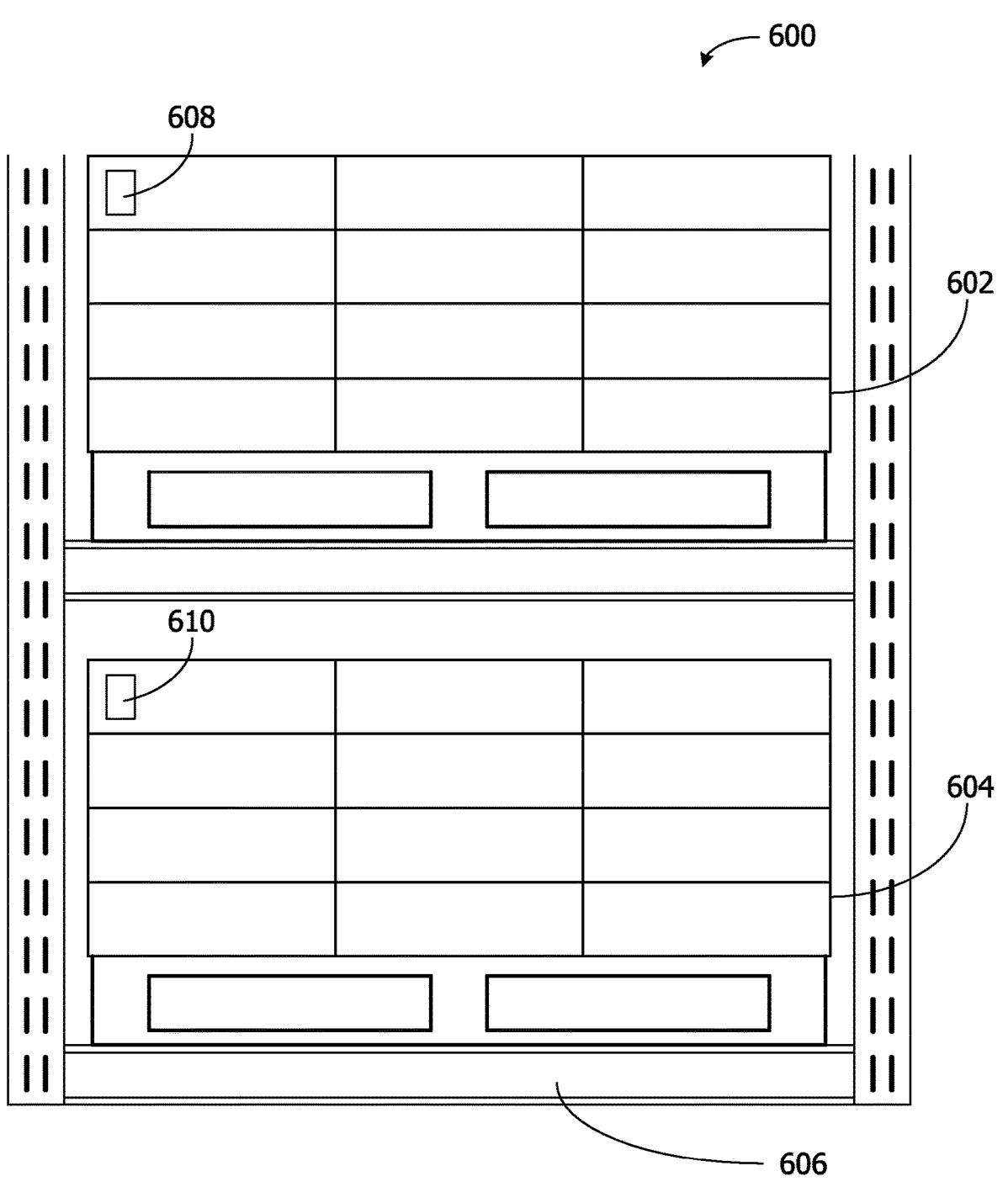
FIG. 6 is an exemplary diagram illustrating an image generated by an image capture device including pallets and pallet tags.

FIG. 6 is an exemplary block diagram illustrating an image 600 generated by an image capture device including pallets and pallet tags. In this example, the image includes a first pallet 602 on a top shelf of an item storage structure 606 and a second pallet on a bottom shelf of the item storage structure 606. The examples are not limited to an item storage structure having two shelves. The item storage structure can include a single shelf, as well as three or more shelves. The item storage structure in other examples can include bins, display cases, or other types of item storage structures.

Each pallet has a pallet tag affixed to an exterior portion of the pallet, such as, but not limited to, the pallet tag 608 on the pallet 602 and the pallet tag 610 on the pallet 604. In this example, the pallet tag is affixed to the upper left hand corner of the pallet on a forward facing side. However, in other embodiments, the pallet tag is affixed to a lower corner of the pallet, a central portion of the front facing side of the pallet, a back of the pallet, a top portion of the pallet, or any other location on the pallet. In some examples, the pallet tag may be missing. In these examples, the system triggers a pallet tag missing exception.

In this example, the detection model(s) add bounding boxes around the detected pallets, the detected pallet tags and/or any other detected items in the image. The bounding boxes may be color coded to add additional layers of information to the image. For example, the bounding boxes surrounding the pallets may be a first color and the bounding boxes placed around the pallet tags may be a different second color.

Figures 7, 8, 9, 10:
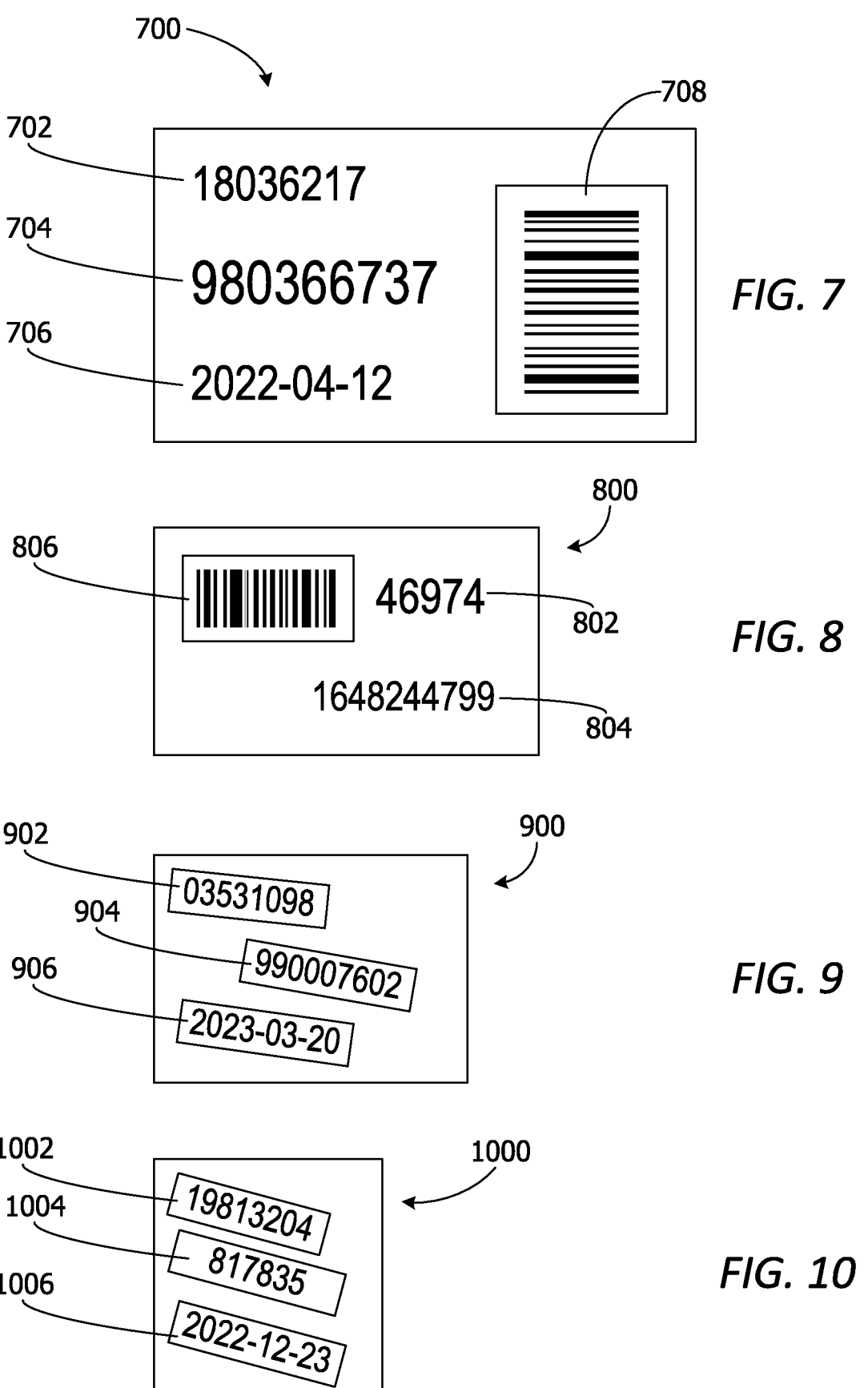
FIG. 7 is an exemplary diagram illustrating a pallet tag including qualified lines of text and non-text markings associated with a first pallet tag format.
FIG. 8 is an exemplary diagram illustrating a pallet tag having pallet attribute data associated with a second pallet tag format.
FIG. 9 is an exemplary diagram illustrating pallet tag image data having bounding boxes encapsulating qualified lines of text.
FIG. 10 is an exemplary diagram illustrating pallet tag image data having quadrilateral bounding boxes encapsulating titled lines of text.

FIG. 7 is an exemplary block diagram illustrating a pallet tag 700 including qualified lines of text and non-text markings associated with a first pallet tag format. In the example of FIG. 7, the pallet tag includes three lines of text. The first line of text 702 includes the pallet ID, the second line of text 704 includes the item ID for the item instances on the pallet, and the date the pallet tag was created in the third line of text 706. In this example, the date the pallet tag was created is Apr. 12, 2022. The barcode 708 is filtered out or otherwise ignored by the pallet text manager.

Referring now to FIG. 8, an exemplary block diagram illustrating a pallet tag 800 having pallet attribute data associated with a second pallet tag format. The format of the text on the pallet tag 800 is different than the format of the text on the pallet tag 700 in FIG. 7 above. In this example, the first line of text 802 includes the item ID and the second line of text 804 includes the pallet ID. The barcode 806 is also positioned adjacent to the first line of text 802. The pallet text manager ignores the barcode.

FIG. 9 is an exemplary block diagram illustrating pallet tag image data 900 having bounding boxes encapsulating qualified lines of text. A first bounding box 902 encloses a first line of text including the pallet ID. A second bounding box 904 encloses a second line of text including the item ID. A third bounding box 906 encloses a third line of text including the date the pallet tag was created. The date, in this example, is Mar. 20, 2023.

Turning now to FIG. 10, an exemplary block diagram illustrating pallet tag image data 1000 having quadrilateral bounding boxes encapsulating titled lines of text is shown.

In this example, a first quadrilateral bounding box 1002 is overlaid over a first line of tilted text including a pallet ID. A second quadrilateral bounding box 1004 encloses a second line of tilted text including an item ID. A third quadrilateral bounding box 1006 encloses a third line of tilted text including a date the pallet tag was created.

The text is tilted in this example because of the camera angle of the image capture device that generated the image of the pallet tag, such as where a camera at a lower level is angled upward to capture an image of a pallet tag on a pallet positioned at a higher level than the camera. This can occur where the pallet is placed on an upper shelf of an item storage structure and the image capture device is located at a lower level than the pallet such that the camera is angled upward to generate the image of the pallet tag. If a traditional rectangular bounding box is used to identify detected text, the text is incompletely enclosed and/or partially overlapped by the bounding box. Instead, the system utilizes a quadrilateral bounding box which is used to enclose pixels associated with the presence of text in the image to enclose the detected text more completely and accurately, even where the text is tilted at an angle in the image.

Figure 11:
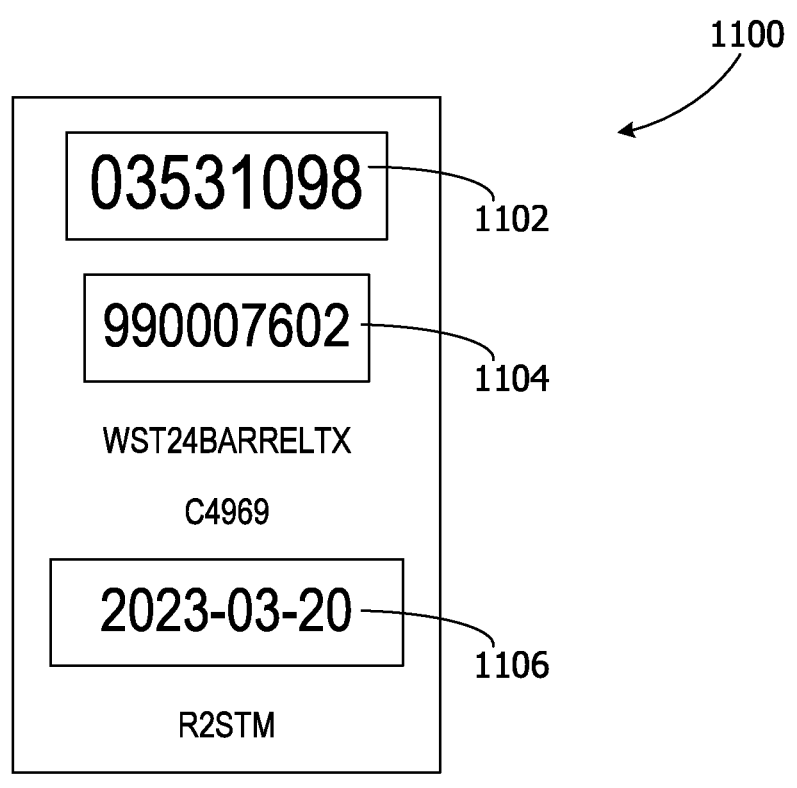
FIG. 11 is an exemplary diagram illustrating a pallet tag image having qualified lines of text encapsulated within rectangular bounding boxes and non-qualified text.

FIG. 11 is an exemplary block diagram illustrating a pallet tag image 1100 having qualified lines of text encapsulated within rectangular bounding boxes and non-qualified text. In this example, a first rectangular bounding box 1102 encloses a first line of text including a pallet ID. A second rectangular bounding box 1104 encloses a second line of text having the item ID at 1104. A third rectangular bounding box 1106 encloses a fifth line of text having the date the pallet tag was created. The third and fourth lines of text are non-qualified lines of text which are filtered out or otherwise ignored by the pallet text manager.

Figure 12:
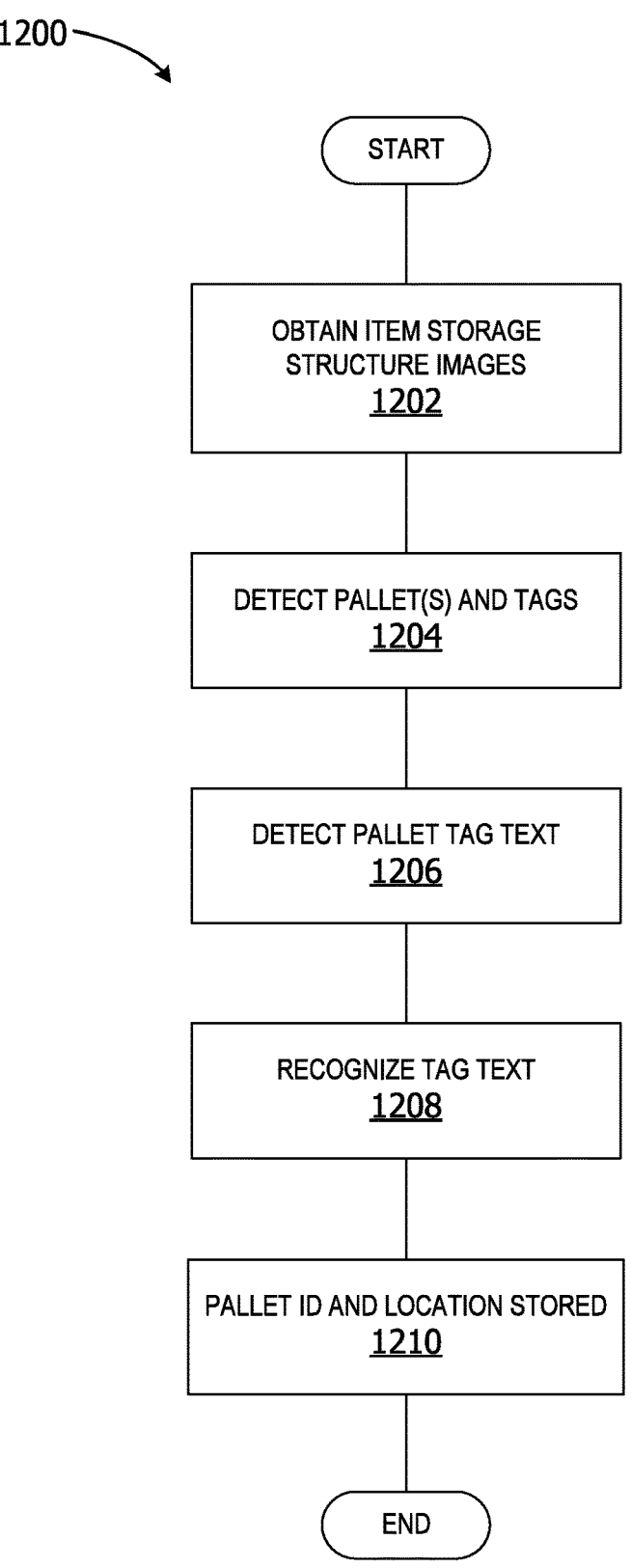
FIG. 12 is an exemplary flow chart illustrating operation of the computing device to detect and recognize pallet tag text.

FIG. 12 is an exemplary flow chart illustrating operation of the computing device to detect and recognize pallet tag text. The process 1200 shown in FIG. 12 is performed by a pallet text manager component, executing on a computing device, such as the computing device 102 in FIG. 1.

The process begins by obtaining item storage structure image(s) at 1202. The image(s) includes images of one or more pallets and/or pallet tags, such as, but not limited to, the pallet 146 and the pallet tag 148 in FIG. 1. The system detects one or more pallet(s) and one or more pallet tag(s) in the image(s) at 1204. The detection of pallets and pallet tags is performed by one or more item detection models, such as, but not limited to, the one or more detection model(s) 202 in FIG. 2. In this example, a single model is used to detect both the pallet and the pallet tag. In other words, the system detects pallets and pallet tags together.

The system detects pallet tag text at 1206. The pallet text detection is performed by a text detection model, such as the text detection model 138 in FIG. 1. The system recognizes pallet tag text at 1208. The text recognition is performed by a convolutional neural network model trained using labeled training data, such as, but not limited to, the one or more recognition model(s) 216 in FIG. 2. The system stores the pallet ID and pallet location at 1210. In some embodiments, the pallet ID and location are stored in a table, such as the pallet attributes table 130 in FIG. 1. The process terminates thereafter.

While the operations illustrated in FIG. 12 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 12.

Figure 13:
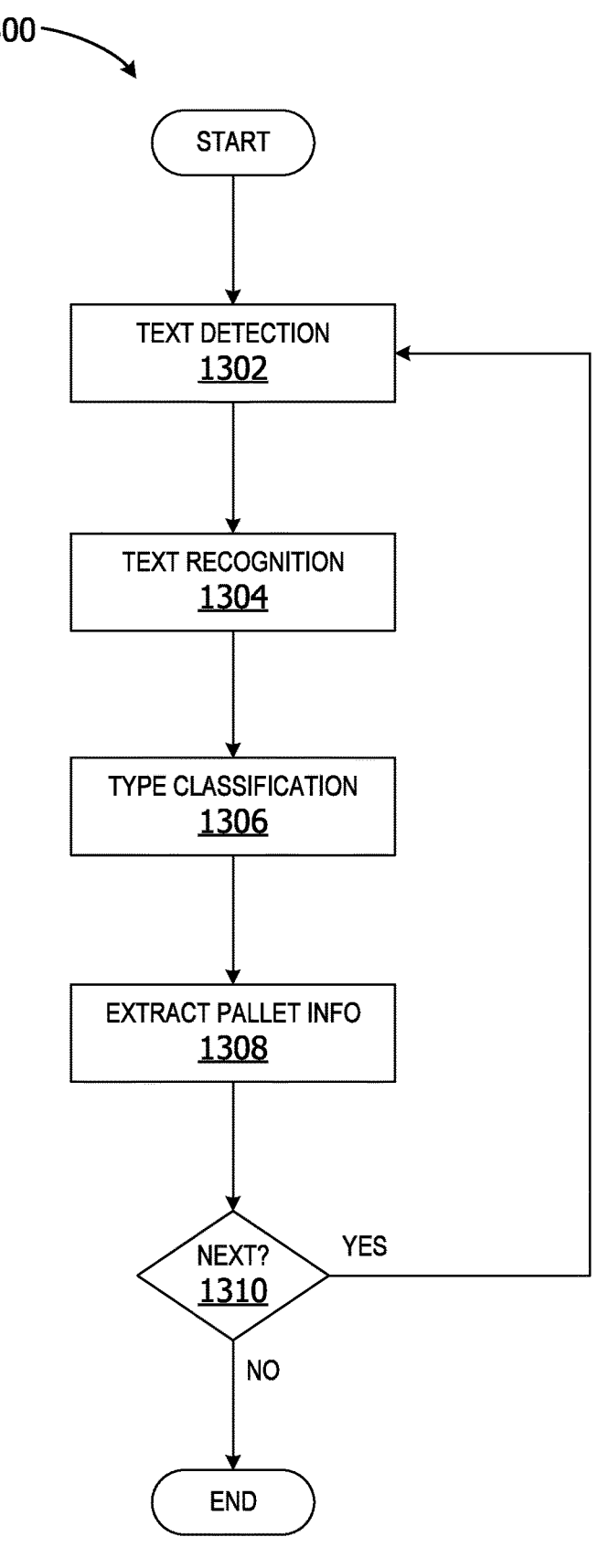
FIG. 13 is an exemplary flow chart illustrating operation of the computing device to recognize and classify pallet tag text.

FIG. 13 is an exemplary flow chart illustrating operation of the computing device to recognize and classify pallet tag text. The process 1300 shown in FIG. 12 is performed by a pallet text manager component, executing on a computing device, such as the computing device 102 in FIG. 1.

The process begins with text detection at 1302. The text detection is performed by a text detection model, such as the text detection model 138 in FIG. 1. The text detection detects text on a pallet tag using an image of the pallet tag or a portion of the pallet tag. The pallet text manager performs text recognition at 1304. The text recognition is performed by a text recognition model analyzing the detected text, such as, but not limited to, the recognition model(s) 216 in FIG. 2. The pallet text manager determines a type of classification of the pallet tag at 1306. The type of classification is performed by a classification model, such as, but not limited to, the classification model 220 in FIG. 2. The pallet text manager extracts pallet information from the qualified lines of text at 1308. A determination is made whether a next pallet tag image is obtained at 1310. If yes, the process iteratively executes operations 1302 through 1310 until there are no additional pallet tag images received from the detection model(s). The process terminates thereafter.

While the operations illustrated in FIG. 13 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 13.

Figure 14:
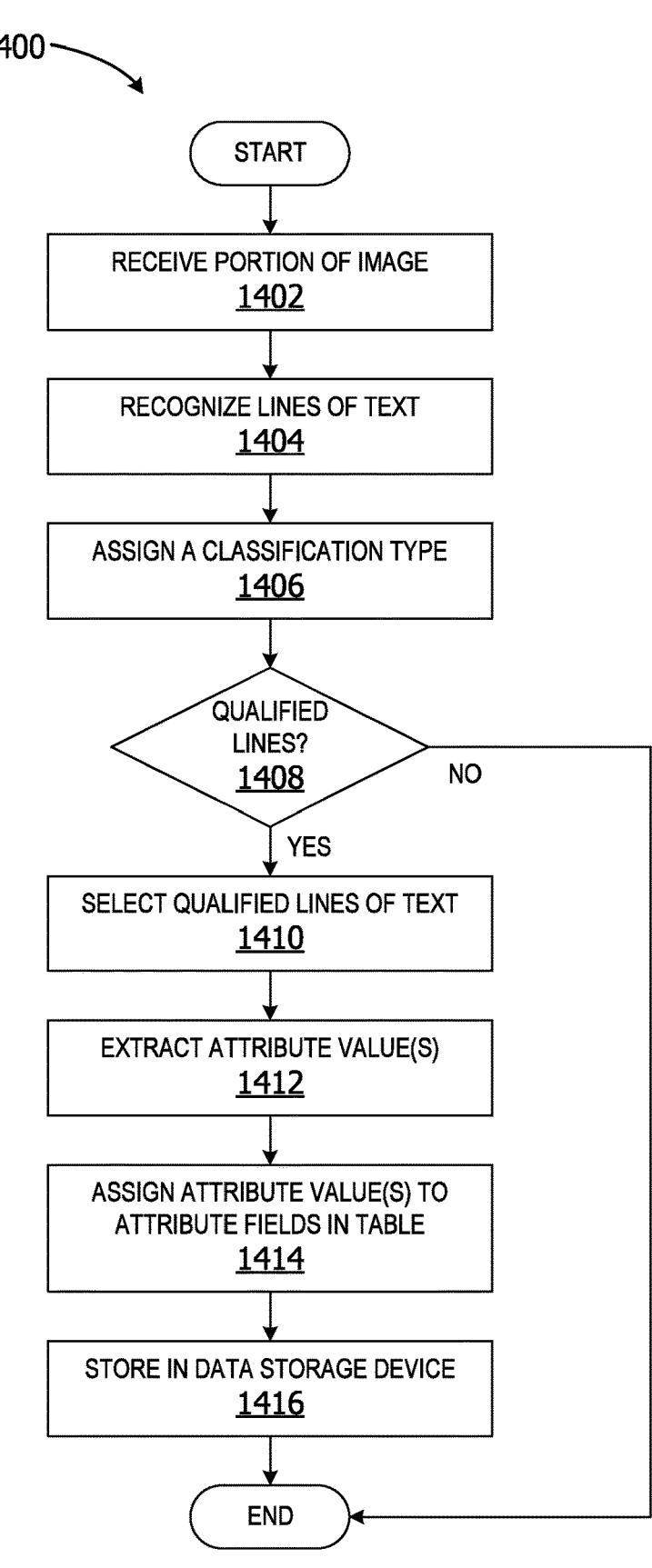
FIG. 14 is an exemplary flow chart illustrating operation of the computing device to identify qualified lines of text in a pallet tag image.

FIG. 14 is an exemplary flow chart illustrating operation of the computing device to identify qualified lines of text in a pallet tag image. The process 1400 shown in FIG. 12 is performed by a pallet text manager component, executing on a computing device, such as the computing device 102 in FIG. 1.

The process begins by receiving a portion of an image at 1402. The image is received from a detection model. The pallet text manager recognizes lines of text at 1404. The lines of text are text included in the pallet tag and recognized by a recognition model. The pallet text manager assigns a classification type to the pallet tag at 1406. A determination is made whether any qualified lines of text are recognized at 1408. A qualified line of text includes information associated with an attribute of a pallet, such as the pallet ID, item ID and/or the date of creation of the pallet tag. If yes, the pallet text manager selects the qualified lines of text from the plurality of lines of text at 1410. The pallet text manager extracts the attribute value(s) from the qualified lines of text at 1412. The attribute value(s) are assigned to the attribute fields in a pallet attribute table at 1414. The pallet attribute table is a table having a plurality of entries associated with identified and located pallets, such as, but not limited to, the pallet attribute table 130 in FIG. 1. The pallet text manager stores the table in a data storage device at 1416. The data storage device is a device for storing data, such as, for example, the data storage device 126 in FIG. 1. The process terminates thereafter.

While the operations illustrated in FIG. 14 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 14.

Figure 15:
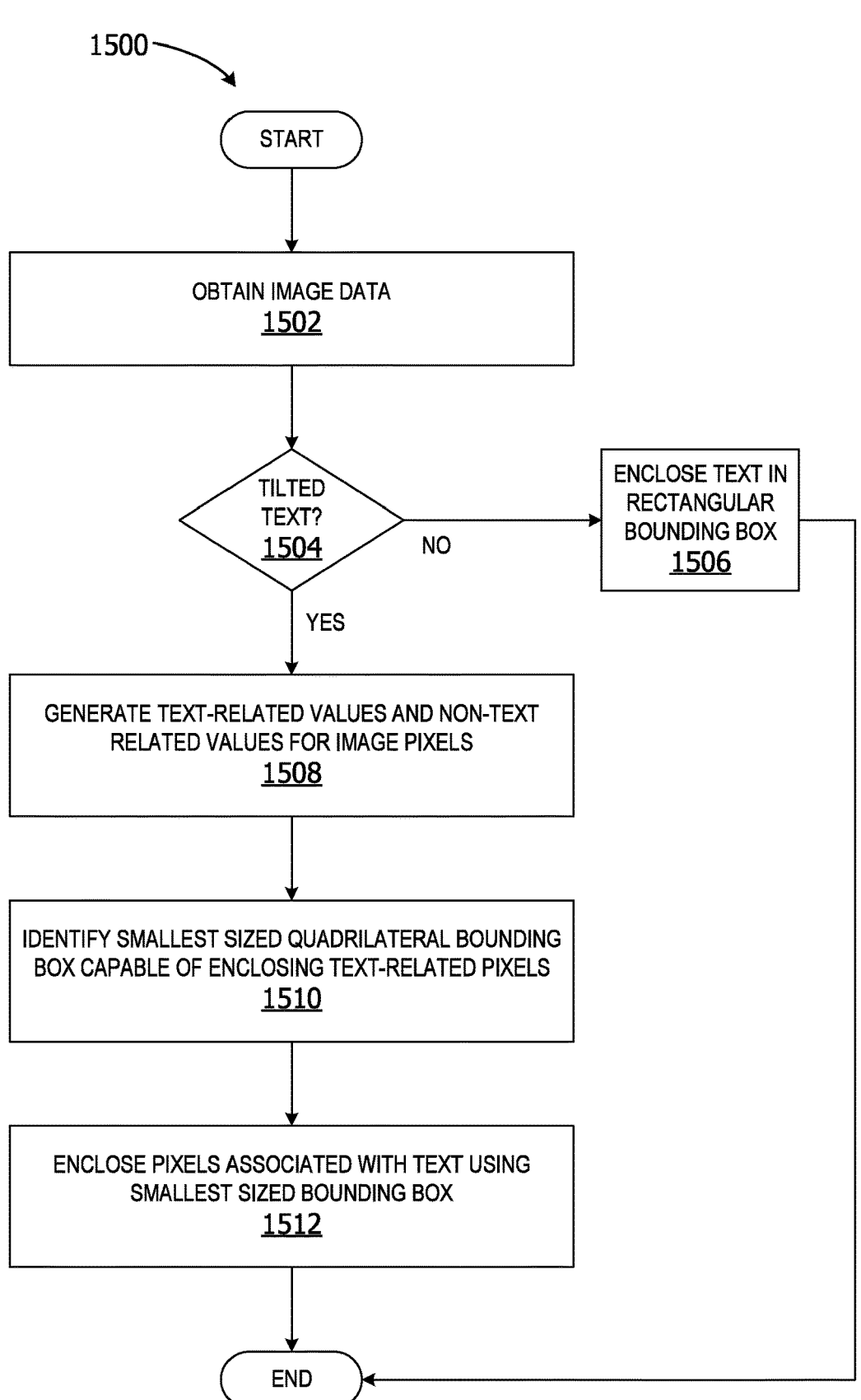
FIG. 15 is an exemplary flow chart illustrating operation of the computing device to identify qualified lines of text in pallet tag image data generated with a tilted image angle.

FIG. 15 is an exemplary flow chart illustrating operation of the computing device to identify qualified lines of text in pallet tag image data generated with a tilted image angle. The process 1500 shown in FIG. 12 is performed by a pallet text manager component, executing on a computing device, such as the computing device 102 in FIG. 1.

The process begins by obtaining image data at 1502. The image data is data associated with images of pallets and/or pallet tags, such as, the image data 134 in FIG. 1. The pallet text manager determines if the text is tilted in the image data at 1504. If not, the text is enclosed in a rectangular bounding box at 1506. The process terminates thereafter.

If the text is tilted at 1504, the pallet text manager generates text-related values and non-text related values for image pixels in the image data at 1508. The text-related values are associated with pixels for text in the image. The non-text related values are associated with pixels for non-text portions of the image. The pallet text manager identifies the smallest sized quadrilateral bounding box capable of enclosing the text-related pixels at 1510. The pallet text manager encloses the pixels associated with text using the identified smallest sized quadrilateral bounding box at 1512. The bounding box is provided via an overlay on the image. The bounding box is optionally color-coded to provide additional information to the pallet text manager. The text inside the bounding box is analyzed to identify and extract pallet attributes from the qualified lines of text detected and recognized in the pallet tag text data. The process terminates thereafter.

While the operations illustrated in FIG. 15 are performed by a computing device, aspects of the disclosure contemplate performance of the operations by other entities. In a non-limiting example, a cloud service performs one or more of the operations. In another example, one or more computer-readable storage media storing computer-readable instructions may execute to cause at least one processor to implement the operations illustrated in FIG. 15.

ADDITIONAL EXAMPLES

In some examples, the system performs pallet tag classification to distinguish between different types of pallets (such as DC pallets, store pallets, and some other noisy pallets with handwritten text). The system recognizes text from cropped pallet tag images with a convolutional recurrent neural network model (which specifically recognizes targeted small text). The system collects labeling images and retrains the model to achieve higher accuracy and handle edge cases. The edge cases include grayscale images instead of color images, camera tilted angle, and multiple types of pallets with different pallet tag layouts.

In other embodiments, a cropped, gray scale image of a pallet tag is provided as input for the classifier model. Information is added to the input image by the tag detection and tag recognition models, such as including an overlay of bounding boxes isolating the tag. The bounding box indicates that the region enclosed by the bounding box contains some text, however, the detection model does not classify the text or recognize the text.

In still other embodiments, changes in pallet tag text layout and font can be confusing for the text recognition models. Changes in layout include changing the locations of information in the tag text and/or changing the placement of barcodes and other information on the tag. Changes in font include changing the size of font, font style, etc. When a change is made to a tag layout or font, it takes time to create labeled training data and retrain a model to handle the new text format. The model may not be able to read or analyze tags having inconsistent or non-uniform text layout and font. Therefore, the system utilizes hyperparameter tuning to train a more generalized text detection model and/or text recognition model using a first version of data associated with a first layout and font. The hyperparameter tuning results in a more flexible model that is capable of detecting and/or recognizing text associated with a different second format and second font that is different than the first format. In this manner, users do not have to keep retraining the models and relabeling training data each time the pallet tag layout and font is changed. This saves time and money spent training and labeling data.

In an example scenario, the system generates cropped pallet tag images and applies a text detection model to locate the text on the pallet tags. The pallet tag classification model distinguishes different types of pallets, such as DC pallets, store pallets and some other noisy pallets with handwritten text. The system recognizes the text from the cropped pallet tag images with a convolutional neural network model which is specifically trained for recognizing small text, such as the text on the pallet tags. The system collects labeling images and retrains the model to achieve higher accuracy and handle edge cases.

Alternatively, or in addition to the other examples described herein, examples include any combination of the following:

detect a tilted line of text within the plurality of lines of text within the cropped image of the portion of the pallet tag;

generate a plurality of text-related values associated with a plurality of text-related pixels in the image and a plurality of non-text related values associated with a plurality of non-text related pixels in the portion of the image, the plurality of text-related values corresponding to alphanumeric characters in the tilted line of text;

enclose the plurality of text-related values within a quadrilateral-shaped bounding box, wherein the quadrilateral-shaped bounding box encloses a plurality of lines of text detected on the pallet tag;

identify a set of disqualified lines of text within the plurality of lines of text using the format of the pallet information;

filter the set of disqualified lines of text from the plurality of lines of text to reduce noise within the plurality of lines of text;

wherein the set of pallet attributes comprises an item ID associated with an item;

pair the item ID with the location of the pallet;

store the item ID paired with the location ID in the pallet entry within the pallet attributes table;

wherein the set of pallet attributes comprises a date of creation of the pallet tag pair the date of creation of the pallet tag with the location of the pallet; and store the date of creation paired with the location ID in the pallet entry within the pallet attributes table;

fine-tune a set of hyperparameters associated with the recognition model, wherein the recognition model is trained on a first version of a data set, and wherein the recognition model having the fine-tuned set of hyperparameters is capable of analyzing pallet tags associated with a second version of the data set;

detect a second plurality of lines of text associated with a second pallet tag having a second tag format;

classify the type of the second pallet tag corresponding to the second tag format;

identify a second set of qualified lines of text within the second plurality of lines of text using the second tag format;

assign the second set of qualified lines of text to a second set of pallet attributes in the pallet attributes table, the set of pallet attributes comprising a second pallet ID, an item ID, and a date of creation of the second pallet tag;

receiving a portion of an image associated with a detected pallet tag associated with a pallet within a retail facility from a pallet tag detection model, the image generated by an image capture device within the retail facility;

recognizing a plurality of lines of text associated with the pallet tag by a text detection model;

assigning a classification type of the pallet tag associated with a source of the pallet based on the plurality of lines of text by a classification model, the classification type of the pallet tag corresponding to a first tag format;

identifying a set of qualified lines of text within the plurality of lines of text using the first tag format associated with the type of pallet tag;

extracting a set of pallet attribute values from the set of qualified lines of text;

assigning the extracted set of pallet attribute values to a set of pallet attribute fields within a pallet attributes table, the set of pallet attribute values comprising a pallet identifier (ID);

storing the set of pallet attribute values paired with a location ID in the assigned set of pallet attribute fields of the pallet attributes table in a data storage device, wherein the pallet ID identifies a location of the pallet within the retail facility, and wherein the location of the pallet is presented to a user via a user interface device for improved accuracy locating pallets within the retail facility;

classifying the pallet tag as a distribution center (DC) type of pallet tag, a store type of pallet tag or a handwritten pallet tag;

detecting a tilted line of text within the plurality of lines of text within the cropped image of the portion of the pallet tag;

generating a plurality of text-related values associated with a plurality of text-related pixels in the image and a plurality of non-text related values associated with a plurality of non-text related pixels in the portion of the image, the plurality of text-related values corresponding to alphanumeric characters in the tilted line of text;

enclosing the plurality of text-related values within a quadrilateral-shaped bounding box, wherein the quadrilateral-shaped bounding box encloses a plurality of lines of text detected on the pallet tag;

mapping the set of pallet attribute values to location data associated with a current location of a robotic device having an image capture device mounted to the robotic device, wherein the image capture device generates a set of images of the pallet for use in identifying the plurality of lines of text associated with the pallet tag on the pallet;

identifying a set of disqualified lines of text within the plurality of lines of text using the format of the pallet information;

filtering the set of disqualified lines of text from the plurality of lines of text to reduce noise within the plurality of lines of text;

identifying an approximate location of each qualified line of text associated with a pallet attribute within the pallet tag and a type of font associated with text on the pallet tag based on the classification type;

receiving a second image of the pallet tag generated by an image capture device generated at a second time;

recognizing the plurality of lines of text associated with the second image;

extracting the set of pallet attribute values from the second image;

updating the assigned set of pallet attribute fields with an updated location of the pallet in the pallet attributes table, wherein the current location of the pallet is updated in-real time as new image data associated with the pallet tag is received from the image capture device;

obtain a portion of an image associated with a detected pallet tag of a pallet within a retail facility from a pallet tag detection model, the image generated by an image capture device within the retail facility;

detect a plurality of lines of text associated with the pallet tag, the plurality of lines of text associated with a first tag format;

classify a type of the pallet tag associated with a source of the pallet based on the plurality of lines of text by a classification model, the type of the pallet tag corresponding to the first tag format;

identify a set of qualified lines of text within the plurality of lines of text using the first tag format associated with the type of pallet tag;

extract a set of pallet attribute values from the set of qualified lines, the set of pallet attribute values comprising a pallet identifier (ID) associated with the pallet;

pair the set of pallet attribute values with location data identifying a current location of the pallet within the retail facility in a pallet entry within the pallet attributes table;

present the pallet ID with the location data to a user via a user interface device to assist the user locating the pallet within the retail facility;

rotate a bounding box enclosing a tilted line of text in the plurality of lines of text to completely encapsulate the tilted line of text within the image;

wherein the first tag format comprises an approximate location of each qualified line of text associated with a pallet attribute within the pallet tag and a type of font associated with text on the pallet tag;

analyze image data associated with a plurality of pallet tags using a set of rules to identify the qualified lines of text;

classify each pallet tag in the plurality of pallet tags based on tag format;

identify qualified text by applying the set of rules to text detection data associated with each pallet tag;

wherein classifying each pallet tag comprises identifying a tag format of information presented on the pallet tag and a font type associated with text on the pallet tag;

classify the pallet tag as a distribution center (DC) type of pallet tag, a store type of pallet tag or a handwritten pallet tag; and wherein the image is an edge case image comprising gray scale image data, a camera tilted angle and a non-standard pallet tag layout.

At least a portion of the functionality of the various elements in FIG. 1, FIG. 2, FIG. 3, FIG. 4, and FIG. 5 can be performed by other elements in FIG. 1, FIG. 2, FIG. 3, FIG. 4 and FIG. 5, or an entity (e.g., processor 106, web service, server, application program, computing device, etc.) not shown in FIG. 1, FIG. 2, FIG. 3, FIG. 4, and FIG. 5.

In some examples, the operations illustrated in FIG. 12, FIG. 13, FIG. 14, and FIG. 15 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other examples, a computer readable medium having instructions recorded thereon which when executed by a computer device cause the computer device to cooperate in performing a method of pallet tag text recognition and classification, the method comprising receiving a portion of an image associated with a detected pallet tag associated with a pallet within a retail facility from a pallet tag detection model, the image generated by an image capture device within the retail facility; recognizing a plurality of lines of text associated with the pallet tag by a text detection model; classifying the pallet tag with a classification type based on the plurality of lines of text by a classification model, the classification type of the pallet tag corresponding to a first tag format; identifying a set of qualified lines of text within the plurality of lines of text using the first tag format associated with the type of pallet tag; extracting a set of pallet attribute values from the set of qualified lines of text; assigning the extracted set of pallet attribute values to a set of pallet attribute fields within a pallet attributes table, the set of pallet attribute values comprising a pallet identifier (ID); and storing the set of pallet attribute values paired with a location ID in the assigned set of pallet attribute fields of the pallet attributes table in a data storage device, wherein the pallet ID identifies a location of the pallet within the retail facility, and wherein the location of the pallet is presented to a user via a user interface device for improved accuracy locating pallets within the retail facility.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable, and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se.

Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Although described in connection with an exemplary computing system environment, examples of the disclosure are capable of implementation with numerous other special purpose computing system environments, configurations, or devices.

Examples of well-known computing systems, environments, and/or configurations that can be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. Such systems or devices can accept input from the user in any way, including from input devices such as a keyboard or pointing device, via gesture input, proximity input (such as by hovering), and/or via voice input.

Examples of the disclosure can be described in the general context of computer-executable instructions, such as program modules, executed by one or more computers or other devices in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions, or the specific components or modules illustrated in the figures and described herein. Other examples of the disclosure can include different computer-executable instructions or components having more functionality or less functionality than illustrated and described herein.

In examples involving a general-purpose computer, aspects of the disclosure transform the general-purpose computer into a special-purpose computing device when configured to execute the instructions described herein.

The examples illustrated and described herein as well as examples not specifically described herein but within the scope of aspects of the disclosure constitute exemplary means for classifying pallet tags for improved pallet tag text recognition used to identify and locate pallets. For example, the elements illustrated in FIG. 1, FIG. 2, FIG. 3, FIG. 4, and FIG. 5, such as when encoded to perform the operations illustrated in FIG. 12, FIG. 13, FIG. 14, and FIG. 15, constitute exemplary means for detecting a plurality of lines of text associated with an image of a pallet tag, the plurality of lines of text associated with a first tag format; constitute exemplary means for classifying a type of the pallet tag based on the plurality of lines of text, the type of the pallet tag corresponding to the first tag format; constitute exemplary means for selecting a set of qualified lines of text within the plurality of lines of text using the first tag format associated with the type of pallet tag, a qualified line of text comprising a pallet attribute; constitute exemplary means for extracting a set of pallet attribute values from the set of qualified lines of text, the set of pallet attribute values comprising a pallet identifier (ID); and constitute exemplary means for mapping the set of pallet attribute values to a location ID in a pallet entry within the pallet attributes table.

Other non-limiting examples provide one or more computer storage devices having a first computer-executable instructions stored thereon for providing a pallet text manager for classifying pallets and recognizing pallet tag text. When executed by a computer, the computer performs operations including obtaining a portion of an image associated with a detected pallet tag of a pallet within a retail facility from a pallet tag detection model, the image generated by an image capture device within the retail facility; detecting a plurality of lines of text associated with the pallet tag, the plurality of lines of text associated with a first tag format; classifying a type of the pallet tag associated with a source of the pallet by a classification model, the type of the pallet tag corresponding to the first tag format; selecting a set of qualified lines of text within the plurality of lines of text using the first tag format associated with the type of pallet tag; identifying a set of pallet attribute values from the set of qualified lines, the set of pallet attribute values comprising a ID associated with the pallet; pairing the set of pallet attribute values with location data identifying a current location of the pallet within the retail facility in a pallet entry within the pallet attributes table; and presenting the pallet ID with the location data to a user via a user interface device to assist the user locating the pallet within the retail facility.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to "A" only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either" "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for pallet text recognition with improved accuracy, the system comprising:
   a data storage device;
   a processor; and
   a computer-readable medium storing instructions that are operative upon execution by the processor to:
   execute a pallet text manager comprising at least a neural network (NN) recognition model, an NN classification model, and an NN location recognition model, wherein the NN recognition model is trained for at least small text recognition and the NN classification model is trained for at least pallet attribute recognition, the pallet text manager being operable to:

detect, using the NN recognition model, a plurality of lines of text associated with an image of a pallet tag associated with a pallet, wherein the plurality of lines of text are associated with a first tag format, and wherein the image comprises a plurality of pixels;

determine, using the NN recognition model, whether one or more lines of text within the plurality of lines of text are tilted within a portion of the image, and based on the determination that one or more the plurality of lines of text are tilted:

generate a plurality of text-related values associated with a plurality of text-related pixels in the portion of the image and a plurality of non-text related values associated with a plurality of non-text related pixels in the portion of the image, the plurality of text-related values corresponding to alphanumeric characters in a tilted line of text; and enclose the plurality of text-related values within a quadrilateral shaped bounding box, wherein the quadrilateral shaped bounding box encloses the plurality of text-related pixels detected on the pallet tag;

classify, using the NN classification model, a type of the pallet tag based on the plurality of lines of text, the type of the pallet tag corresponding to the first tag format;

select, using the NN classification model, a set of qualified lines of text within the plurality of lines of text using the first tag format associated with the type of the pallet tag by applying a stored first set of rules associated with the first tag format to identify a qualified lines of text, wherein the qualified lines of text comprising a pallet attribute;

extract a set of pallet attribute values from the set of qualified lines of text, the set of pallet attribute values comprising a pallet identifier (ID); and map the set of pallet attribute values to a location ID in a pallet entry within a pallet attributes table stored in the data storage device, wherein the location ID identifies a location of the pallet within a retail facility, wherein the location ID is being generated by the NN location recognition model, and wherein the location of the pallet is presented to a user via a user interface device.

2. The system of claim 1, wherein the quadrilateral shaped bounding box is color-coded to indicate items recognized in the image, and wherein the pallet text manager interprets the color-coded indicators according to a stored set of rules associated with the first tag format.

3. The system of claim 1, wherein the instructions are further operative to:

identify a set of disqualified lines of text within the plurality of lines of text; and filter the set of disqualified lines of text from the plurality of lines of text to reduce noise within the plurality of lines of text.

4. The system of claim 1, wherein the set of pallet attribute values comprises an item ID associated with an item, wherein the instructions are further operative to:

pair the item ID with the location of the pallet; and store the item ID paired with the location ID in the pallet entry within the pallet attributes table.

5. The system of claim 1, wherein the set of pallet attribute values comprises a date of creation of the pallet tag, wherein the instructions are further operative to:

pair the date of creation of the pallet tag with the location of the pallet; and store the date of creation paired with the location ID in the pallet entry within the pallet attributes table.

6. The system of claim 1, wherein the instructions are further operative to:

fine-tune a set of hyperparameters associated with a recognition model implemented on the processor, wherein the recognition model is trained on a first version of a data set, and wherein the recognition model is capable of analyzing pallet tags associated with a second version of the data set.

7. The system of claim 1, wherein the instructions are further operative to:

detect a second plurality of lines of text associated with a second pallet tag having a second tag format;

classify the type of the second pallet tag corresponding to the second tag format;

identify a second set of qualified lines of text within the second plurality of lines of text using the second tag format; and assign the second set of qualified lines of text to a second set of pallet attributes in the pallet attributes table, the set of pallet attribute values comprising a second pallet ID, an item ID, and a date of creation of the second pallet tag.

8. A method for pallet text recognition with improved accuracy, the method comprising:

receiving a portion of an image associated with a pallet tag associated with a pallet within a retail facility, the image generated by an image capture device within the retail facility;

executing a pallet text manager comprising at least a neural network (NN) recognition model, an NN classification model, and an NN location recognition model, wherein the NN recognition model is trained for at least small text recognition and the NN classification model is trained for at least pallet attribute recognition, the pallet text manager being operable to:

detecting, using the NN recognition model, a plurality of lines of text associated with the portion of the image of the pallet tag associated with the pallet, wherein the plurality of lines of text are associated with a first tag format, and wherein the image comprises a plurality of pixels;

determining, using the NN recognition model, whether one or more lines of text within the plurality of lines of text are tilted within a portion of the image, and based on the determination that one or more the plurality of lines of text are tilted:

generating a plurality of text-related values associated with a plurality of text-related pixels in the portion of the image and a plurality of non-text related values associated with a plurality of non-text related pixels in the portion of the image, the plurality of text-related values corresponding to alphanumeric characters in a tilted line of text; and enclosing the plurality of text-related values within a quadrilateral shaped bounding box, wherein the quadrilateral shaped bounding box encloses the plurality of text-related pixels detected on the pallet tag;

classifying, using the NN classification model, a type of the pallet tag based on the plurality of lines of text, the type of the pallet tag corresponding to the first tag format;

selecting, using the NN classification model, a set of qualified lines of text within the plurality of lines of text using the first tag format associated with the type of the pallet tag by applying a stored first set of rules associated with the first tag format to identify a qualified
lines of text, wherein the qualified lines of text com-
prising a pallet attribute;

extracting a set of pallet attribute values from the set of
qualified lines of text, the set of pallet attribute values
comprising a pallet identifier (ID); and mapping the set of pallet attribute values to a location ID
in a pallet entry within a pallet attributes table stored in
a data storage device, wherein the location ID identifies
a location of the pallet within the retail facility, wherein
the location ID is being generated by the NN location
recognition model, and wherein the location of the
pallet is presented to a user via a user interface device.

9. The method of claim 8, further comprising:

classifying the pallet tag as a distribution center (DC) type
of pallet tag, a store type of pallet tag or a handwritten
pallet tag.

10. The method of claim 8, wherein the quadrilateral shaped bounding box is color-coded to
indicate items recognized in the image, and wherein the
pallet text manager interprets the color-coded indica-
tors according to a stored set of rules associated with
the first tag format.

11. The method of claim 8, further comprising:

mapping the set of pallet attribute values to location data
associated with a current location of a robotic device
having the image capture device mounted to the robotic
device, wherein the image capture device generates a
set of images of the pallet for use in identifying the
plurality of lines of text associated with the pallet tag on
the pallet.

12. The method of claim 8, further comprising:

identifying a set of disqualified lines of text within the
plurality of lines of text; and filtering the set of disqualified lines of text from the
plurality of lines of text to reduce noise within the
plurality of lines of text.

13. The method of claim 8, further comprising:

identifying an approximate location of each qualified line
of text associated with a pallet attribute within the
pallet tag and a type of font associated with text on the
pallet tag based on the classification type.

14. The method of claim 8, wherein the image of the pallet
tag is a first image generated at a first time, and further
comprising:

receiving a second image of the pallet tag generated by the
image capture device generated at a second time;

recognizing the plurality of lines of text associated with
the second image;

extracting a set of pallet attribute values from the second
image; and updating a set of pallet attribute fields with an updated
location of the pallet in the pallet attributes table,
wherein a current location of the pallet is updated
in-real time as new image data associated with the
pallet tag is received from the image capture device.

15. One or more computer storage devices having com-
puter-executable instructions stored thereon, which, upon
execution by a computer, cause the computer to perform
operations comprising:

obtain a portion of an image associated with a pallet tag
detected on a pallet within a retail facility, the image
generated by an image capture device within the retail
facility;

execute a pallet text manager comprising at least a neural
network (NN) recognition model, an NN classification
model, and an NN location recognition model, wherein the NN recognition model is trained for at least small
text recognition and the NN classification model is
trained for at least pallet attribute recognition, the pallet
text manager being operable to:

detect, using the NN recognition model, a plurality of
lines of text associated with the portion of the image of
the pallet tag associated with the pallet, wherein the
plurality of lines of text are associated with a first tag
format, and wherein the portion of the image comprises
a plurality of pixels;

determine, using the NN recognition model, whether one
or more lines of text within the plurality of lines of text
are tilted within the portion of the image, and based on
the determination that one or more the plurality of lines
of text are tilted:

generate a plurality of text-related values associated
with a plurality of text-related pixels in the portion of
the image and a plurality of non-text related values
associated with a plurality of non-text related pixels
in the portion of the image, the plurality of text-
related values corresponding to alphanumeric char-
acters in a tilted line of text; and enclose the plurality of text-related values within a
quadrilateral shaped bounding box, wherein the
quadrilateral shaped bounding box encloses a plu-
rality of lines of text detected on the pallet tag;

classify, using the NN classification model, a type of the
pallet tag based on the plurality of lines of text, the type
of the pallet tag corresponding to the first tag format;

select, using the NN classification model, a set of quali-
fied lines of text within the plurality of lines of text
using the first tag format associated with the type of the
pallet tag by applying a stored first set of rules asso-
ciated with the first tag format to identify a qualified
lines of text, wherein the qualified lines of text com-
prising a pallet attribute;

extract a set of pallet attribute values from the set of
qualified lines of text, the set of pallet attribute values
comprising a pallet identifier (ID); and map the set of pallet attribute values to a location ID in a
pallet entry within a pallet attributes table stored in a
data storage device, wherein the location ID identifies
a location of the pallet within the retail facility, wherein
the location ID is being generated by the NN location
recognition model, and wherein the location of the
pallet is presented to a user via a user interface device.

16. The one or more computer storage devices of claim
15, wherein the operations further comprise:

rotate a bounding box enclosing the tilted line of text in
the plurality of lines of text to completely encapsulate
the tilted line of text within the image.

17. The one or more computer storage devices of claim
15, wherein the first tag format comprises an approximate
location of each qualified line of text associated with a pallet
attribute within the pallet tag and a type of font associated
with text on the pallet tag.

18. The one or more computer storage devices of claim
15, wherein the operations further comprise:

analyze image data associated with a plurality of pallet
tags using a set of rules for identifying the set of
qualified lines of text.

19. The one or more computer storage devices of claim
15, wherein the operations further comprise:

classify the pallet tag as a distribution center (DC) type of
pallet tag, a store type of pallet tag or a handwritten
pallet tag.

20. The one or more computer storage devices of claim 15, wherein the image is an edge case image comprising gray scale image data, camera tilted angle and a non-standard pallet tag layout.

* * * * *